US012634371B2

(12) United States Patent
Hu et al.

(10) Patent No.: US 12,634,371 B2
(45) Date of Patent: May 19, 2026

(54) CONTEXT TRANSFER METHOD AND COMMUNICATION APPARATUS

(71) Applicant: HUAWEI TECHNOLOGIES CO., LTD., Shenzhen (CN)

(72) Inventors: Yajie Hu, Beijing (CN); Cuili Ge, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 18/482,820

(22) Filed: Oct. 6, 2023

(65) Prior Publication Data

US 2024/0040005 A1 Feb. 1, 2024

Related U.S. Application Data

(63) Continuation of application No. PCT/CN2022/083051, filed on Mar. 25, 2022.

(30) Foreign Application Priority Data

| | | |
|---|---|---|
| Apr. 7, 2021 | (CN) | 202110374553.3 |
| May 19, 2021 | (CN) | 202110545128.6 |
| Jul. 6, 2021 | (CN) | 202110763755.7 |

(51) Int. Cl.
*H04L 67/148* (2022.01)
*H04L 67/10* (2022.01)

(52) U.S. Cl.
CPC ............ *H04L 67/148* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2021/0058489 A1* | 2/2021 | Kim | H04W 36/322 |
| 2022/0191650 A1* | 6/2022 | Kim | H04L 67/53 |
| 2023/0262134 A1* | 8/2023 | Tangudu | H04L 67/125 |
| | | | 709/224 |

FOREIGN PATENT DOCUMENTS

| | | | |
|---|---|---|---|
| IN | 202041031792 | * | 7/2020 |
| IN | 202041031792 A | * | 7/2020 |

OTHER PUBLICATIONS

3rd Generation Partnership Project;Technical Specification Group Services and System Aspects;Architecture for enabling Edge Applications; (Release 17) 3GPP TS 23.558 V2.0.0 (Mar. 2021) total:141pages.

(Continued)

*Primary Examiner* — Fadi Haj Said

(57) ABSTRACT

This application provides a context transfer method and a communication apparatus. The method includes: When an edge enabler client context fails to be relocated from a second edge enabler server to a first edge enabler server, a first apparatus sends first information to a first edge application server corresponding to the first edge enabler server, where the first information is used by the first edge application server to subscribe to edge enabler server capability exposure information from the first edge enabler server. In the foregoing technical solution, when an edge enabler client context fails to be transferred, the first apparatus may indicate a target edge application server to subscribe to edge enabler server capability exposure information from a target edge enabler server.

20 Claims, 14 Drawing Sheets

(56)                  References Cited

OTHER PUBLICATIONS

Huawei et al: "Application context relocation event notification API and related procedure", 3GPP Draft: S6-210302, 3rd Generation Partnership Project (3GPP), Mobile Competence Centre; 650, Route Des Lucioles : F-06921 Sophia-Antipolis Cedex; France, vol. SA WG6, No. e-meeting; Jan. 18, 2021-Jan. 26, 2021 Jan. 24, 2021 (Jan. 24, 2021) , XP052181817, total 12 pages.

Huawei et al: "Coordination the relocation of EEC context and application context via T-EES",3GPP Draft: S6-210893, 3rd Generation Partnership Project (3GPP), Mobile Competence Centre; 650, Route Des Lucioles ; F-06921 Sophia-Antipolis Cedex; France vol. SA WG6, No. e-meeting; Apr. 12, 2021-Apr. 20, 2021 Apr. 7, 2021 (Apr. 7, 2021) , XP052178550, total 3 pages.

Samsung: "Terms and abbreviations for service continuity", 3GPP Draft; S6-210633, 3rd Generation Partnership Project (3GPP), Mobile Competence Centre ; 650, route des Lucioles; F-06921 Sophia-Antipolis Cedex ; France, vol. SA WG6, No. e-meeting; Mar. 1, 2021-Mar. 9, 2021, Mar. 6, 2021(Mar. 6, 2021), XP051983084, total 29 pages.

Huawei, Hisilicon, ACR with full operations at edge enabler layer, 3GPP TSG-SA WG6 Meeting #39BIS-e, e-meeting, Oct. 12-20, 2020, S6-201833, total 4 pages.

\* cited by examiner

CONTEXT TRANSFER METHOD AND COMMUNICATION APPARATUS

CROSS-REFERENCE TO RELATED APPLICATIONS

This application is a continuation of International Application No. PCT/CN2022/083051, filed on Mar. 25, 2022, which claims priority to Chinese Patent Application No. 202110763755.7, filed on Jul. 6, 2021 and Chinese Patent Application No. 202110545128.6, filed on May 19, 2021 and Chinese Patent Application No. 202110374553.3, filed on Apr. 7, 2021. All of the afore-mentioned patent applications are hereby incorporated by reference in their entireties.

TECHNICAL FIELD

This application relates to the communication field, and more specifically, to a context transfer method and a communication apparatus.

BACKGROUND

In a running process of an edge application, when a terminal moves out of a current service area, an edge application server (EAS) that currently provides a service possibly cannot continue to serve the currently running application, or is no longer an optimal edge application server that can serve the terminal, but another edge application server may be more suitable for serving the terminal. In this case, a new edge application server may be selected to serve the terminal. However, in a process in which the new edge application server replaces the edge application server that currently provides the service, the application service is temporarily suspended or interrupted, and application service transfer is affected.

SUMMARY

This application provides a context transfer method and a communication apparatus, to help reduce duration of suspension or interruption of an application service in an edge application server switching process, so as to improve transfer continuity of the application service.

According to a first aspect, this application provides a context transfer method. The method includes: When an edge enabler client (EEC) context fails to be relocated from a second edge enabler server (EES) to a first EES, a first apparatus sends first information to a first edge application server EAS corresponding to the first EES, where the first information is used by the first EAS to subscribe to EES capability exposure information from the first EES.

Optionally, the first apparatus may be a source EES, a target EES, or an EEC.

That the EEC context is transferred from the second EES to the first EES may also be understood as that the first EES is a target EES, and the second EES is a source EES.

In the foregoing technical solution, when the EEC context fails to be transferred, the first apparatus may indicate a target EAS to subscribe to EES capability exposure information from a target EES, so that re-execution of an entire EEC context relocation procedure can be avoided, and duration of suspension or interruption of an application service in an edge application server switching process can be reduced. Therefore, transfer continuity of the application service is improved.

With reference to the first aspect, in a possible implementation, the first information includes EEC context transfer failure notification information or first indication information, where the EEC context transfer failure notification information notifies the first EAS that the EEC context fails to be transferred, and the first indication information indicates the first EAS to subscribe to the EES capability exposure information from the first EES.

In some implementations, the first information includes EEC context transfer failure notification information and application context transfer success notification information, where the EEC context transfer failure notification information notifies an EEC that the EEC context fails to be transferred, and the application context transfer success notification information notifies the EEC that an application context is successfully transferred.

In the foregoing technical solution, the first information may directly or indirectly indicate the first EAS to subscribe to the EES capability exposure information from the first EES.

With reference to the first aspect or any possible implementation of the first aspect, in another possible implementation, the EES capability exposure information includes at least one of the following information: a user equipment (UE) location application programming interface (API), an application context relocation event, an application client (AC) information exposure API, a UE identifier API, and a quality of service (QoS) session API.

UE location API: The EES exposes the UE location API to the EAS to support tracking or checking a valid UE location. The UE location API disclosed by the EES depends on a 3GPP core network capability. The EAS may request the UE location API to make a one-time report to check a current UE location and request continuous reports to track the UE location. The UE location API supports both a one-time query request response (for checking the current UE location) and a subscription notification model, to continuously provide the UE location to the EAS and enable the EAS to track the UE location (as the UE location changes).

Application context relocation event: The EES exposes, to the EAS, an ACR management event notification for one or more UEs (for example, to trigger ACR). The ACR management event notification exposed by the EES may depend on a northbound API of a network exposure function (NEF) to monitor a user plane path management event. The application context relocation event may also be replaced with an application context relocation event.

AC information exposure API: The EAS obtains AC capability information from the EES. This information may facilitate communication, for example, notification push, between the EAS and an AC. Shared information is subject to access control and privacy and security mechanisms.

UE identifier API: The EES exposes the UE identifier API to the EAS to provide an identifier that uniquely identifies UE. When the EAS does not have the UE identifier, the EAS uses this API to obtain the UE identifier. This identifier is referred to as an edge UE ID and is used by the EAS to invoke a UE-specific capability API through EDGE-3.

QoS session API: The EES exposes a session API having QoS to the EAS to support establishment of a data session, having specific QoS, between the AC and the EAS and a modification of the QoS of the data session.

With reference to the first aspect or any possible implementation of the first aspect, in another possible implementation, the first apparatus is the first EES or the second EES; and the method further includes: The first apparatus sends second information to the EEC, where the second information is used by the EEC to initiate registration with the first EES.

Optionally, the second information may directly or indirectly indicate the EEC to initiate registration with the first EES. For example, the second information includes the EEC context transfer failure notification information, and the EEC context transfer failure notification information notifies the EEC that the EEC context fails to be transferred. For another example, the second information includes the EEC context transfer failure notification information and the application context transfer success notification information, where the EEC context transfer failure notification information notifies the EEC that the EEC context fails to be transferred, and the application context transfer success notification information notifies the EEC that the application context is successfully transferred. For another example, the second information includes second indication information, and the second indication information indicates the EEC to initiate registration with the first EES.

Optionally, if the first apparatus is the target EES, the target EES may determine, based on an actual situation of the target EES, whether to indicate the EEC to register with the target EES.

In consideration of a case in which for some EESs, an EES can use an edge application service only after the EEC registers with the EES, in the foregoing technical solution, the first apparatus indicates the EEC to register with the first EES, so as to use an edge application service.

With reference to the first aspect or any possible implementation of the first aspect, in another possible implementation, the first apparatus is the first EES or the second EES; and the method further includes: The first apparatus sends third information to the EEC, where the third information is used by the EEC to subscribe to an EAS discovery and/or EAS information service from the first EES. It may also be understood that the EEC subscribes to information of Edge-1 (to be specific, between the EEC and the EES), for example, an EAS availability change and an EAS dynamic information change.

Optionally, the third information may directly or indirectly indicate the EEC to subscribe to the EAS discovery and/or EAS information service from the first EES. For example, the third information includes the EEC context transfer failure notification information, and the EEC context transfer failure notification information notifies the EEC that the EEC context fails to be transferred. For another example, the third information includes the EEC context transfer failure notification information and the application context transfer success notification information, where the EEC context transfer failure notification information notifies the EEC that the EEC context fails to be transferred, and the application context transfer success notification information notifies the EEC that the application context is successfully transferred. For another example, the third information includes third indication information, and the third indication information indicates the EEC to subscribe to the EAS discovery and/or EAS information service from the first EES.

With reference to the first aspect or any possible implementation of the first aspect, in another possible implementation, the first apparatus is the second EES, and the method further includes: The first apparatus receives fourth information from the second EES, where the fourth information indicates that the EEC context fails to be transferred; and the first apparatus determines, based on the fourth information, that the EEC context fails to be transferred.

With reference to the first aspect or any possible implementation of the first aspect, in another possible implementation, the method further includes: When relocation of an application context is triggered, the first apparatus determines the first EES and the first EAS; the first apparatus transfers the EEC context to the first EES; and the first apparatus indicates a second EAS corresponding to the first apparatus to send the application context to the first EAS; or the first apparatus sends, to the first EAS through the first EES, the application context obtained from the second EAS.

In the foregoing technical solution, the source EES initiates and coordinates the transfer of the application context and the EEC context, to ensure that both the application context and the EEC context are relocated to the target side when the application context is relocated, so as to avoid a lack of necessary subscription information during application running, help reduce the duration of the suspension or interruption of the application service in the edge application server switching process, and improve the transfer continuity of the application service.

With reference to the first aspect or any possible implementation of the first aspect, in another possible implementation, the first apparatus is the EEC; and the method further includes: The first apparatus subscribes to the EAS discovery and/or EAS information service from the first EES. It may also be understood that the EEC subscribes to information of Edge-1 (to be specific, between the EEC and the EES), for example, an EAS availability change and an EAS dynamic information change.

With reference to the first aspect or any possible implementation of the first aspect, in another possible implementation, that a first apparatus sends first information to an EAS corresponding to the first EES includes: The first apparatus sends the first information to the first EAS through the first EES.

For example, the indication sent by the S-EES is transparently transferred or forwarded by the T-EES to the T-EAS.

For another example, the S-EES may indicate, to the T-EES, that the T-EAS needs to subscribe to a required service from the T-EES, and the T-EES further indicates the T-EAS to subscribe to the required service from the T-EES.

With reference to the first aspect or any possible implementation of the first aspect, in another possible implementation, the first apparatus is the first EES, and the method further includes: When the first apparatus does not receive the EEC context from the second EES, the first apparatus determines that the EEC context fails to be transferred.

With reference to the first aspect or any possible implementation of the first aspect, in another possible implementation, the method further includes: When relocation of an application context is triggered, the first apparatus determines the second EES and a second EAS corresponding to the second EES; and the first apparatus requests the EEC context from the second EES; and the first apparatus indicates the first EAS to request the application context from the second EAS; or the first apparatus requests the application context from the second EES.

In the foregoing technical solution, the target EES initiates and coordinates the transfer of the application context and the EEC context, to ensure that both the application context and the EEC context are relocated to the target side when the application context is relocated, so as to avoid a lack of necessary subscription information during application running, help reduce the duration of the suspension or interruption of the application service in the edge application server switching process, and improve the transfer continuity of the application service.

With reference to the first aspect or any possible implementation of the first aspect, in another possible implementation, the first apparatus is the EEC, and the method further includes: The first apparatus initiates registration with the first EES.

In consideration of a case in which for some EESs, an EES can use an edge application service only after the EEC registers with the EES, in the foregoing technical solution, the EEC registers with the first EES, so as to use an edge application service.

With reference to the first aspect or any possible implementation of the first aspect, in another possible implementation, the method further includes: The first apparatus receives fifth information from the first EES or the second EES, where the fifth information indicates that the EEC context fails to be transferred; and the first apparatus determines, based on the fifth information, that the EEC context fails to be transferred.

With reference to the first aspect or any possible implementation of the first aspect, in another possible implementation, the method further includes: When relocation of an application context is triggered, the first apparatus sends sixth information to the first EES or the second EES, where the sixth information indicates to initiate transfer of the application context and the EEC context.

In the foregoing technical solution, the EEC initiates and coordinates the transfer of the application context and the EEC context, to ensure that both the application context and the EEC context are relocated to the target side when the application context is relocated, so as to avoid a lack of necessary subscription information during application running, help reduce the duration of the suspension or interruption of the application service in the edge application server switching process, and improve the transfer continuity of the application service.

With reference to the first aspect or any possible implementation of the first aspect, in another possible implementation, that a first apparatus sends first information to an EAS corresponding to the first EES includes: The first apparatus sends the first information to the first EAS through the first EES.

For example, the indication sent by the EEC is transparently transferred or forwarded by the T-EES to the T-EAS.

For another example, the EEC may indicate, to the T-EES, that the T-EAS needs to subscribe to a required service from the T-EES, and the T-EES further indicates the T-EAS to subscribe to the required service from the T-EES.

According to a second aspect, this application provides a context transfer method. The method includes: A first EAS receives first information from a first apparatus, where the first information is used by the first EAS to subscribe to EES capability exposure information from a first EES corresponding to the first EAS; and the first EAS subscribes to the EES capability exposure information from the first EES based on the first information.

Optionally, the first apparatus may be a source EES, a target EES, or an EEC.

In the foregoing technical solution, the first EAS may subscribe to the EES capability exposure information from the target EES based on the indication of the first apparatus, so that re-execution of an entire EEC context relocation procedure can be avoided, and duration of suspension or interruption of an application service in an edge application server switching process can be reduced. Therefore, transfer continuity of the application service is improved.

With reference to the second aspect, in a possible implementation, the first information includes EEC context transfer failure notification information or first indication information, where the EEC context transfer failure notification information notifies the first EAS that an EEC context fails to be transferred, and the first indication information indicates the first EAS to subscribe to the EES capability exposure information from the first EES.

In some implementations, the first information includes EEC context transfer failure notification information and application context transfer success notification information, where the EEC context transfer failure notification information notifies an EEC that an EEC context fails to be transferred, and the application context transfer success notification information notifies the EEC that an application context is successfully transferred.

With reference to any one of the second aspect or the possible implementations of the second aspect, in another possible implementation, the EES capability exposure information includes at least one of the following information: a UE location API, an application context relocation event, an AC information exposure API, a UE identifier API, and a QoS session API.

According to a third aspect, this application provides a context transfer method. The method includes: When an application context is successfully transmitted and an EEC context fails to be transmitted, a first apparatus requests a second EES to re-transfer the EEC context to the first apparatus, or the first apparatus re-transfers the EEC context to a first EES, where the EEC context is transferred by the second EES to the first EES.

In the foregoing technical solution, when an application context is successfully transferred and an EEC context fails to be transferred, the first apparatus may indicate a source EES to re-transfer the EEC context to a target EES, or indicate the target EES to request the source EES to re-transfer the EEC context, so that re-execution of an entire EEC context relocation procedure can be avoided, and duration of suspension or interruption of an application service in an edge application server switching process can be reduced. Therefore, transfer continuity of the application service is improved.

According to a fourth aspect, this application provides a context transfer method. The method includes: When an application context is successfully transferred and an EEC context fails to be transferred, a first apparatus sends seventh information to a second EES, where the seventh information indicates the second EES to re-transfer the EEC context to a first EES; or the first apparatus sends eighth information to a first EES, where the eighth information indicates the first EES to request a second EES to re-transfer the EEC context, and the EEC context is transferred by the second EES to the first EES.

In the foregoing technical solution, when an application context is successfully transferred and an EEC context fails to be transferred, the first apparatus may indicate a source EES to re-transfer the EEC context to a target EES, or indicate the target EES to request the source EES to re-transfer the EEC context, so that re-execution of an entire EEC context relocation procedure can be avoided, and duration of suspension or interruption of an application service in an edge application server switching process can be reduced. Therefore, transfer continuity of the application service is improved.

According to a fifth aspect, this application provides a context transfer method. The method includes: When an EEC context is successfully transferred, an application context fails to be transferred, and the EES needs to be reselected, a first apparatus deletes the EEC context; or the first apparatus sends ninth information to a first EES, where the ninth information indicates the first EES to delete the EEC context, and the EEC context is transferred by a second EES to the first EES.

In the foregoing technical solution, when the EEC context is successfully transferred, the application context fails to be transferred, and the EES needs to be reselected, the first apparatus may delete the EEC context, or may indicate the target EES to delete the EEC context, so that storage of the unnecessary EEC context in the EES can be avoided.

According to a sixth aspect, this application provides a context transfer method. The method includes: When an EEC context is successfully transferred, an application context fails to be transferred, and the EES does not need to be reselected, a first apparatus sends tenth information to a second EAS, where the tenth information indicates the second EAS to re-transfer the application context to a first EAS; or the first apparatus sends eleventh information to the first EAS, where the eleventh information indicates the first EAS to request a second EAS to re-transfer the application context.

That is, in this case, the first apparatus determines not to delete the EEC context, and indicates the source EAS to re-transfer the application context.

Optionally, the first apparatus may be a source EES, a target EES, or an EEC.

In the foregoing technical solution, when an EEC context is successfully transferred, an application context fails to be transferred, and the EES does not need to be reselected, the first apparatus may indicate a source EAS to re-transfer the application context to a target EAS, or indicate the target EAS to request the source EAS to re-transfer the application context, so that re-execution of an entire application context relocation procedure can be avoided, and duration of suspension or interruption of an application service in an edge application server switching process can be reduced. Therefore, transfer continuity of the application service is improved.

With reference to the third aspect to the sixth aspect, in a possible implementation, the first apparatus is the source EES, and the method further includes: When relocation of the application context is triggered, the first apparatus determines the target EES and the target EAS corresponding to the target EES; the first apparatus transfers the EEC context to the target EES; and the first apparatus indicates the source EAS corresponding to the first apparatus to send the application context to the target EAS; or the first apparatus sends, to the target EES, the application context obtained from the source EAS.

With reference to any one of the third aspect to the sixth aspect or the possible implementations thereof, in another possible implementation, the method further includes: The first apparatus receives fourth information from the target EES, where the fourth information indicates a transfer result of the EEC context; and the first apparatus determines the transfer result of the EEC context transfer based on the fourth information.

With reference to any one of the third aspect to the sixth aspect or the possible implementations thereof, in another possible implementation, the first apparatus is the target EES, and the method further includes: When relocation of the application context is triggered, the first apparatus determines the source EES and a source EAS corresponding to the source EES; the first apparatus requests the EEC context from the source EES; and the first apparatus indicates the target EAS to request the application context from the source EAS; or the first apparatus requests the application context from the source EES.

With reference to any one of the third aspect to the sixth aspect or the possible implementations thereof, in another possible implementation, the method further includes: The first apparatus determines the transfer result of the EEC context depending on whether the EEC context from the source EES is received.

With reference to any one of the third aspect to the sixth aspect or the possible implementations thereof, in another possible implementation, the first apparatus is the EEC, and the method further includes: When relocation of the application context is triggered, the first apparatus sends sixth information to the source EES or the target EES, where the sixth information indicates to initiate transfer of the application context and the EEC context.

With reference to any one of the third aspect to the sixth aspect or the possible implementations thereof, in another possible implementation, the method further includes: The first apparatus receives fifth information from the source EES or the target EES, where the fifth information indicates the transfer result of the EEC context; and the first apparatus determines the transfer result of the EEC context based on the fifth information.

According to a seventh aspect, this application provides a context transfer method. The method includes: An EEC receives second information from a first apparatus, where the second information is used by the EEC to initiate registration with a first EES; and the EEC initiates registration with the first EES based on the second information.

Optionally, the second information may directly or indirectly indicate the EEC to initiate registration with the first EES. For example, the second information includes EEC context transfer failure notification information, and the EEC context transfer failure notification information notifies the EEC that an EEC context fails to be transferred. For another example, the second information includes EEC context transfer failure notification information and application context transfer success notification information, where the EEC context transfer failure notification information notifies the EEC that an EEC context fails to be transferred, and the application context transfer success notification information notifies the EEC that an application context is successfully transferred. For another example, the second information includes second indication information, and the second indication information indicates the EEC to initiate registration with the first EES.

With reference to the seventh aspect, in a possible implementation, the method further includes: The EEC receives third information from the first apparatus, where the third information indicates the EEC to subscribe to an EAS discovery and/or EAS information service from the first EES; and the EEC subscribes to the EAS discovery and/or EAS information service from the first EES based on the third information.

Optionally, the third information may directly or indirectly indicate the EEC to subscribe to the EAS discovery and/or EAS information service from the first EES. For example, the third information includes the EEC context transfer failure notification information, and the EEC context transfer failure notification information notifies the EEC that the EEC context fails to be transferred. For another example, the third information includes the EEC context transfer failure notification information and the application context transfer success notification information, where the EEC context transfer failure notification information notifies the EEC that the EEC context fails to be transferred, and the application context transfer success notification information notifies the EEC that the application context is successfully transferred. For another example, the third information includes third indication information, and the third indication information indicates the EEC to subscribe to the EAS discovery and/or EAS information service from the first EES. According to an eighth aspect, this application provides a communication apparatus. The apparatus includes a module configured to perform the method according to any one of the foregoing aspects or the possible implementations of the foregoing aspect.

According to a ninth aspect, this application provides a communication apparatus, including a processor. The processor is coupled to a memory, and may be configured to execute instructions in the memory, to implement the method according to any possible implementation of any one of the foregoing aspects. Optionally, the apparatus further includes the memory. Optionally, the apparatus further includes a communication interface, and the processor is coupled to the communication interface.

According to a tenth aspect, this application provides a chip, including a processor. The processor is coupled to a memory, and may be configured to execute instructions in the memory, to implement the method according to any possible implementation of any one of the foregoing aspects. Optionally, the apparatus further includes the memory. Optionally, the apparatus further includes a communication interface, and the processor is coupled to the communication interface.

According to an eleventh aspect, this application provides a processor, including an input circuit, an output circuit, and a processing circuit. The processing circuit is configured to: receive a signal through the input circuit; and transmit a signal through the output circuit, so that the processor performs the method according to any possible implementation of any one of the foregoing aspects.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transferred by the transmitter, and the input circuit and the output circuit may be a same circuit, where the circuit is used as the input circuit and the output circuit at different moments. Specific implementations of the processor and the various circuits are not limited in embodiments of this application.

According to a twelfth aspect, this application provides a communication apparatus, including a processor and a memory. The processor is configured to read instructions stored in the memory, receive a signal through a receiver, and transmit a signal through a transmitter, to perform the method according to any possible implementation of any one of the foregoing aspects.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be separately disposed on different chips. A type of the memory and a manner in which the memory and the processor are disposed are not limited in embodiments of this application.

It should be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may be from a receiver. The transmitter and the receiver may be collectively referred to as a transceiver.

The apparatus in the twelfth aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to a thirteenth aspect, this application provides a computer-readable storage medium. The computer-readable storage medium stores a computer program or instructions. When the computer program is executed or the instructions are executed, the method according to any possible implementation of any one of the foregoing aspects is implemented.

According to a fourteenth aspect, this application provides a computer program product, including instructions. When the instructions are run, the method according to any possible implementation of any one of the foregoing aspects is implemented.

According to a fifteenth aspect, this application provides a communication system. The communication system includes any one or more of the foregoing communication apparatuses.

DESCRIPTION OF EMBODIMENTS

The following describes technical solutions of this application with reference to accompanying drawings.

The technical solutions in embodiments of this application may be applied to various communication systems, for example, a 5th generation (5G) mobile communication system, a new radio access technology (NR) system, a long term evolution (LTE) system, an LTE frequency division duplex (FDD) system, an LTE time division duplex (TDD) system, a universal mobile telecommunications system (UMTS), or a worldwide interoperability for microwave access (WiMAX) communication system. The mobile communication system may include a non-standalone (NSA) communication system and/or a standalone (SA) communication system. Alternatively, the technical solutions provided in this application may be applied to a future communication system, for example, a 6th generation mobile communication system. This is not limited in this application.

The technical solutions provided in this application may further be applied to machine type communication (MTC), a long term evolution-machine (LTE-M) technology, a device-to-device (device-to-device, D2D) network, a machine-to-machine (M2M) network, an internet of things (IoT) network, or another network. The IoT network may include, for example, an internet of vehicles. Communication modes in an internet of vehicles system are collectively referred to as vehicle-to-X (V2X, where X may represent anything). For example, V2X may include vehicle-to-vehicle (V2V) communication, vehicle-to-infrastructure (V2I) communication, vehicle-to-pedestrian (V2P) communication, or vehicle-to-network (V2N) communication.

The technical solutions in this application may be applied to various communication scenarios, for example, a service continuity scenario and a mobile edge computing (mobile edge computing, MEC) scenario. This is not limited in this application.

Figure 1:
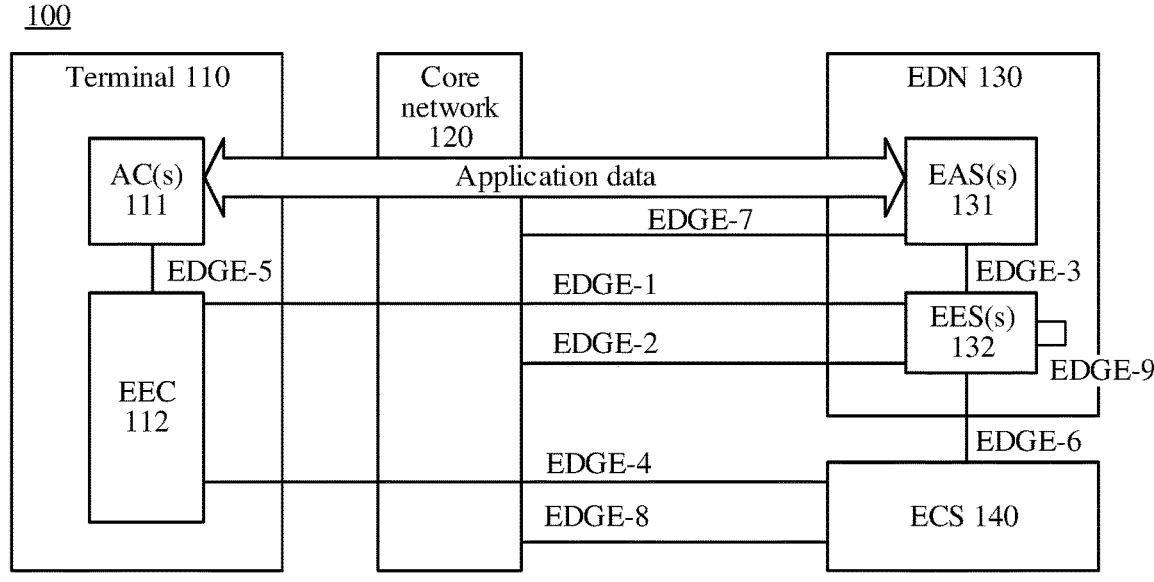
FIG. 1 is a schematic diagram of an architecture of a communication system 1000 to which embodiments of this application are applied.

FIG. 1 is a schematic diagram of an architecture of a communication system 1000 to which embodiments of this application are applied. As shown in FIG. 1, the communication system includes a terminal 110, a core network 120, an edge data network (EDN) 130, and an edge configuration server (ECS) 140. One or more ACs 111 and one or more EECs 112 may be deployed in the terminal 110, and one or more EASs 131 and one or more EESs 132 may be deployed in the EDN 130. An EDGE-1 interface is an interface between the EES 132 and the EEC 112, an EDGE-2 interface is an interface between the EES 132 and the core network 120, an EDGE-3 interface is an interface between the EAS 131 and the EES 132, an EDGE-4 interface is an interface between the EEC 112 and the ECS 140, an EDGE-5 interface is an interface between the AC 111 and the EEC 112, an EDGE-6 interface is an interface between the EES 132 and the ECS 140, an EDGE-7 interface is an interface between the EAS 131 and the core network 120, an EDGE-8 interface is an interface between the ECS 140 and the core network 120, and an EDGE-9 interface is an interface between the EESs 132. FIG. 1 is merely a schematic diagram. The communication system may further include another network device that is not shown in FIG. 1.

An application user signs a service agreement with an application provider, so that a service is provided for the application user. The application user may log in to the AC 111 on the terminal 110, and communicate with the EDN 130 through a connection between the AC 111 and the EAS 131. The EEC 112 is a middleware layer, and is generally located in an operating system, or located between the AC 111 and the operating system. The AC 111 may obtain an edge enabler service from the EEC 112 through an API.

For ease of understanding, the following describes some network elements, terms, and the like in this application.

1. Multi-Access Edge Computing MEC

MEC can use a radio access network to provide a required IT service and cloud computing function for a telecom user nearby, to create a carrier-class service environment with high performance, a low latency, and high bandwidth, accelerate rapid download of various content, services, and applications in the network, and enable a consumer to enjoy uninterrupted high-quality network experience.

2. Data Network

A data network (DN) is a service network of an operator or a third party, and may provide a service (for example, an operator service or an Internet service) for a terminal.

3. Local Data Network

A local data network (local DN) may be an access point (access point) of a data network that is very close to an attachment point of a user.

4. Edge Data Network EDN

In one understanding, an EDN corresponds to only one data network, is a special local data network including an edge enabler function, can use a data network access identifier (DNAI) and a data network name (DNN), and is a network logical concept.

In another understanding, the EDN is an equivalent concept of a central cloud, may be understood as a local data center (a geographical location concept), may be identified by using a DNAI, and may include one or more local data networks.

5. Edge Application Server EAS

An application deployed in an EDN may be referred to as an EAS. Specifically, the EAS may be an instance that is of a server application (for example, social media software, augmented reality (AR), or virtual reality (VR)) and that is deployed and that runs in the EDN.

One or more EASs can be deployed in one or more EDNs for an application. EASs deployed and run in different EDNs can be considered as different EASs of an application. The EASs can share one domain name, use one IP address, or use different IP addresses.

The EAS may also be replaced with an edge application, an edge application server, an application instance, an edge application instance, an MEC application, an MEC application server, an EAS function, or the like. This is not limited in this application. For ease of description, the EAS is collectively referred to as an edge application server below.

6. Application Client AC

An AC is a peer entity of an application server on a terminal side, and is used by an application user to obtain an application service from the application server. An AC may be a client program of an application on a terminal side. The AC may be connected to an application server on a cloud to obtain an application service; or may be connected to an EAS that is deployed and that runs in one or more EDNs to obtain an application service. The AC may also be referred to as an application program client. This is not limited in this application.

7. Edge Enabler Server EES

An EES can provide some enabling capabilities for an EAS deployed in an EDN. The EES may support registration of an edge application server, authentication and authorization on a terminal, provide the terminal with IP address information of the edge application server, and the like. The EES may further support obtaining an identifier and the IP address information of the edge application server, and further support sending the obtained identifier and the IP address information to an ECS. The EES is deployed in the EDN.

Generally, an EAS is registered with an EES; or information about an EAS is configured in an EES by using a management system. The EES is referred to as an EES associated with the EAS, or the EAS is referred to as an EAS associated with the EES. The EES controls or manages the EAS registered with or configured in the EES.

The EAS associated with the EES may also be replaced with the EAS corresponding to the EES, and the EES associated with the EAS may also be replaced with the EES corresponding to the EAS. This is not limited in this application.

8. Edge Enabler Client EEC

An EEC is a peer entity of an EES on a terminal side. The EEC may be configured to register information about the EEC and information about an AC with the EES, perform security authentication and authentication, obtain an IP address of an EAS from the EES, provide an edge computing enabling capability for the AC, and the like. For example, the EEC may return the IP address of the EAS to the AC by using an EAS discovery service.

9. Edge Configuration Server ECS

An ECS is mainly responsible for configuring an EDN. For example, the ECS may provide information about an EES for a terminal. For another example, the ECS may alternatively interact with a DNS of an application to obtain information about an EAS, and directly provide the information about the EAS for the terminal. The ECS may alternatively obtain and store information about an EAS and an IP address from another functional entity.

10. Terminal

A terminal may also be referred to as a terminal device, user equipment (user equipment, UE), a mobile station, a mobile terminal, or the like. The terminal may be widely applied to various scenarios such as device to device (D2D), vehicle to everything (V2X) communication, machine type communication (MTC), an internet of things (IoT), virtual reality, augmented reality, industrial control, self-driving, telemedicine, a smart grid, smart furniture, a smart office, a smart wearable device, smart transportation, and a smart city. The terminal may be a mobile phone, a tablet computer, a computer with a wireless transceiver function, a wearable device, a vehicle, an unmanned aerial vehicle, a helicopter, an airplane, a ship, a robot, a robot arm, a smart home device, or the like. A specific technology and a specific device form used by the terminal are not limited in this embodiment of this application.

11. Application Context

An application context may be running status information, for example, a game process, ML historical data, and the like, related to one user or a group of users. Optionally, the application context may further include a context of subscription of the one or more users in an EAS and a core network, for example, a subscription transaction identifier. Optionally, the application context may further include a context of the one or more users in an EES, for example, a transaction identifier of subscription of the one or more users by the EAS.

12. EEC Context

An EEC context may be user-related data stored in an EES.

The EEC context may include EEC-side information and EAS-EES subscription information. The EEC-side information may include EEC registration information and EEC subscription information (for example, EAS discovery subscription and EAS dynamic information subscription). The EAS-EES subscription information may include a UE location API, an application context relocation event, an AC information exposure API, a UE identifier API, a QoS session API, and the like.

13. Application Context Relocation (ACR)

Application context relocation may also be referred to as application context relocation. They are not distinguished in this application.

In a running process of an edge application, when a terminal moves out of a current service area, an EAS that currently provides a service may not continue to serve the currently running application; or an EAS that currently provides a service is not an optimal EAS that can serve the terminal, and another EAS may be more suitable for serving the terminal. In this case, a new EAS may be selected to serve the terminal. However, in a process in which the new edge application server replaces the edge application server that currently provides the service, the application service is temporarily suspended or interrupted, and transfer of the application service is affected.

To minimize the impact of the application running interruption, an application context may be relocated. For ease of description, in the following descriptions, the EAS that currently provides the service is referred to as a source EAS (S-EAS), and the new EAS is referred to as a target EAS (T-EAS).

An application context relocation procedure can be divided into the following four phases:

Phase 1: Detection of Application Context Relocation

In this phase, it may be determined that the context relocation may be required. A target event may be detected by a detection entity. The target event may include a terminal location change, a terminal user plane path update, and the like.

Phase 2: Decision-Making on the Application Context Relocation

In this phase, a decision entity determines that the context relocation is required.

Phase 3: Execution of the Application Context Relocation

In this phase, an execution entity transfers an application context from a source EAS to a target EAS. Further, this phase includes discovery of the target EAS, a terminal may be further notified of related information of the target EAS, and EASs (which may be the source EAS and the target EAS) are notified to initiate application context transfer, and an EES or the EAS executes application function (AF) traffic influence (AF traffic influence) and includes N6 routing information of the T-EAS.

Phase 4: Clean-Up after the Application Context Relocation

In this phase, a plurality of entities are involved. The EAS notifies the EEC of an application context transfer result through the EES. An AC initiates a new socket connection to the target EAS.

It should be noted that the foregoing entities may be a same entity, or may be different entities. This is not limited.

The following describes several specific implementations of application context relocation with reference to FIG. 2 to FIG. 9.

Figure 2:
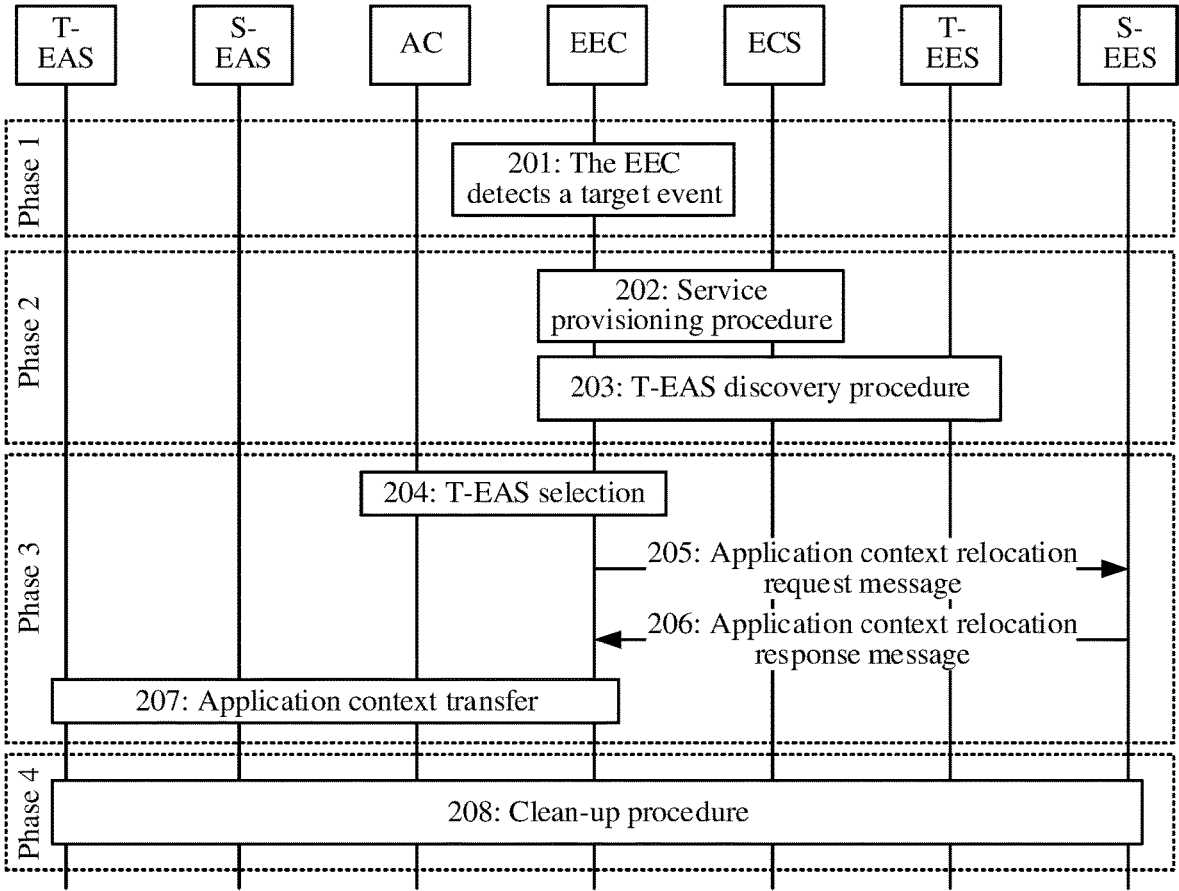
FIG. 2 is an implementation of application context relocation.

FIG. 2 is an implementation of application context relocation.

In this implementation, an EEC initiates ACR, and uses a regular EAS discovery procedure.

Step 201: The EEC detects a target event, and determines to trigger application context relocation.

The target event may include a UE location change, a UE user plane path update, and the like.

For example, the EEC detects a UE location update.

Step 202: The EEC executes a service provisioning procedure to discover a T-EES.

Figure 3:
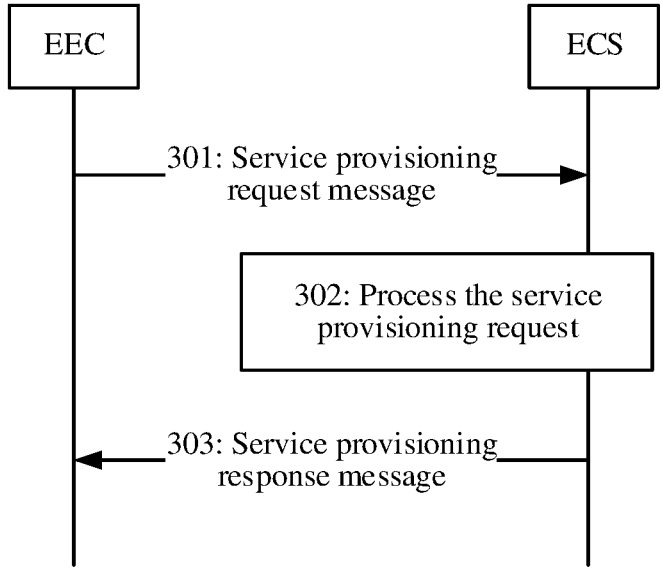
FIG. 3 is a schematic diagram of a service provisioning procedure.

The following describes step 202 in detail with reference to FIG. 3.

Step 203: The EEC performs a regular EAS discovery procedure to discover one or more EASs.

Figure 4:
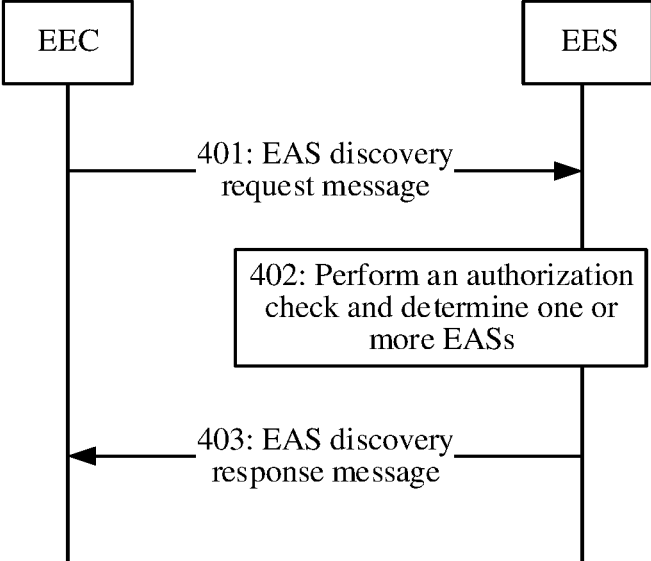
FIG. 4 is a schematic diagram of a regular EAS discovery procedure.

The following describes step 202 in detail with reference to FIG. 4.

Step 204: An AC selects a T-EAS from the one or more EASs discovered by the EEC.

Step 205: The EEC sends an application context relocation request message to an S-EES.

Step 206: The S-EES sends an application context relocation response message to the EEC.

Step 207: An S-EAS transfers an application context with the T-EAS.

Step 208: After the application context is transferred, each entity performs a clean-up procedure.

It can be learned that, in the implementation shown in FIG. 2, the EEC detects, decides, and determines the T-EES and the T-EAS, the EEC requests the S-EES to initiate a user plane path modification, and the EEC or the AC initiates the transfer of the application context.

FIG. 3 is a schematic diagram of a service provisioning procedure.

Prerequisites: An ECS configures, based on a UE location, a service requirement, service preference, and connectivity, available edge computing service information related to the EEC. The information is used by the EEC to discover an available related EES.

Step 301: The EEC sends a service provisioning request message to the ECS.

The service provisioning request message may include an EEC ID (identifier), a security credential, an AC profile, a UE identifier, connectivity information, a UE location, and the like. The UE identifier may include a generic public subscription identifier (GPSI) and the like.

In an example, Table 1 shows information elements that may be included in the service provisioning request message.

TABLE 1

| Information element | State | Descriptions |
|---|---|---|
| EEC ID | Mandatory (M) | Unique identifier of the EEC |
| Security credential | Mandatory | Security credential generated when an edge computing service is successfully authorized |
| AC profile (application client profile(s)) | Optional (O) | Information about a service that the EEC expects to connect to |
| UE identifier | Optional | UE identifier (for example, a GPSI or an identity token) |
| Connectivity information | Optional | UE connectivity information list (for example, a public land mobile network (PLMN) ID and a service set identifier (SSID)) |
| UE location | Optional | UE location information |

Step 302: After receiving the service provisioning request message, the ECS processes the service provisioning request.

Specifically, the ECS performs authentication and authorization, and matches, based on the AC profile and the UE location information that are provided by the EEC, an EES registered with the ECS.

Step 303: The ECS sends a service provisioning response message to the EEC.

If the ECS cannot determine EEC information based on the service provisioning request message, the ECS rejects the service provisioning request of the EEC and provides a failure cause.

If the ECS successfully processes the service provisioning request of the EEC, the ECS can provide EDN connection information, a list of EESs satisfying EEC request information, EES address identification information, and the like.

In an example, Table 2 shows information elements that may be included in the service provisioning response message.

TABLE 2

| Information element | State | Descriptions |
|---|---|---|
| Success response | Optional | Indicate that the service provisioning request succeeds. |
| List of EDN configuration information (list of EDN configuration information) | Mandatory | EDN list |
| EDN connection information | Mandatory | Information required for establishing a connection between UE and an EDN |
| DNN/APN | Mandatory | Data network name/access point name |
| S-NSSAI | Optional | Network slice information |
| EDN topological service area area) | Optional | Cell ID (Cell ID) list or tracking area identity (tracking area identity, TAI) list The EDN serves UEs that access a core network from the cells. |

TABLE 2-continued

| Information element | State | Descriptions |
|---|---|---|
| List of EESs (list of edge enabler servers) | Mandatory | EES list of the EDN |
| EES ID | Mandatory | EES identifier |
| EES endpoint (EES endpoint) | Mandatory | EES endpoint address (for example, a uniform resource identifier (URI) and an internet protocol (internet protocol, IP) address) |
| EAS ID (edge application server ID) | Optional | ID of an EAS registered with the EES |
| ECSP information (ECSP info) | Optional | Edge computing service provider information |
| EES topological service area | Optional | List of cell IDs or TAIs served by the EES The EES does not need to serve an EEC of UE that is not in the cell in the list and that is connected to the core network. |
| EES geographical service area (EES geographical service area) | Optional | Geographic area served by the EES |
| List of EES DNAIs | Optional | EES/EAS related DNAI This IE is used as a potential location for an application |
| lifetime | Optional | Duration for which EDN configuration information is valid and needs to be buffered in the EEC |
| Failure response | Optional | Indicate that the service provisioning request fails. |
| Cause | Optional | Indicate a cause why the service provisioning request fails. |

FIG. 4 is a schematic diagram of a regular EAS discovery procedure.

Prerequisites: 1. The EEC receives information about an EES, such as a URL and an IP address of the EES. 2. An EAS discovery policy of an ECSP is configured in the EES.

Step 401: The EEC sends an EAS discovery request message to the EES.

The EAS discovery request message may include an EEC ID and a security credential. The EAS discovery request message may further include an EAS discovery filter to retrieve information about a specific EAS or a specific type of EAS (for example, a game application).

In an example, Table 3 shows information elements that may be included in the EAS discovery request message.

TABLE 3

| Information element | State | Descriptions |
|---|---|---|
| Requester identifier | Mandatory | Identifier of a requester (For example, the EEC ID) |
| UE identifier | Optional | UE identifier (for example, a GPSI or an identity token) |
| Security credential | Mandatory | Security credential generated when an edge computing service is successfully authorized |
| EAS discovery filter | Optional | This information element is for determining a group of features of the required EAS. |

In an example, Table 4 shows information elements that may be included in the EAS discovery filter.

TABLE 4

| Information element | State | Descriptions |
|---|---|---|
| AC feature list | Optional | This information element is for describing an AC that needs to match the EAS. |
| AC profile (NOTE 2) | Mandatory | AC profile including a parameter for determining that the AC matches the EAS. |
| EAS feature list | Optional | This information element describes a feature of the required edge application server EAS. |
| EAS ID | Optional | Required EAS identifier |
| EAS provider identifier | Optional | Identifier of a required EAS provider program |
| EAS type | Optional | Category or type of the required EAS (for example, V2X) |
| EAS schedule (EAS schedule) | Optional | Availability plan required by the EAS (for example, a time window) |
| EAS geographical service area | Optional | Location at which an EAS service is available (for example, a geographical area and a route) |
| EAS topological service area | Optional | Topological area (for example, an ID of a cell and a TAI, where an EAS service of the cell is available) |

TABLE 4-continued

| Information element | State | Descriptions |
|---|---|---|
| Service continuity support | Optional | Whether service continuity support is required |
| EAS status | Optional | EAS status (For example, enabled or disabled) |
| Service right level | Optional | Required service right level |
| Service feature | Optional | Required service function (For example, a single-player game and a multi-player game) |

In an example, Table 5 shows information elements that may be included in the AC profile.

TABLE 5

| Information element | State | Descriptions |
|---|---|---|
| AC ID | Mandatory | AC identifier |
| AC type | Optional | AC category or type (for example, V2X) |
| Preferred ECSP list | Optional | When being used for the service provisioning request, this information element indicates, to the ECS, an ECSP preferred by the AC. The ECS may use this information during EES selection. |
| AC schedule | Optional | Expected AC operation timesheet (for example, a time window) |
| Expected AC geographical service area | Optional | This information element is for deploying an expected location of UE in the AC operation schedule. The geographic information may indicate a geographical point, a polygon, a route, a signal map, a road point set, or the like. |
| Service continuity support | Optional | Indicate whether an application requires service continuity support. |
| List of EASs | Optional | List of EASs that serve the AC and a service key performance indicator (key performance indicator, KPI) of required by the AC |
| EAS ID | Mandatory | EAS identifier |
| AC service KPI | Optional | KPI required by the AC to receive a service of the EAS |

Step 402: After receiving the EAS discovery request sent by the EEC, the EES performs an authorization check and determines one or more EASs.

Specifically, if the EES determines that the EEC is authorized to discover the requested EAS, the EES determines the one or more EASs based on the provided EAS discovery filter and the UE location. If no EAS discovery filter is provided in the EAS discovery request message, the EES determines the one or more EASs based on UE-specific service information in the EES and the UE location, or the EES determines the one or more EASs by applying an ECSP policy (for example, based only on the UE location). If the EES cannot determine the one or more EASs by using the information carried in the EAS discovery request message, the UE-specific service information in the EES and the UE location, or the ECSP policy, the EES rejects the EAS discovery request of the EEC and provides a corresponding failure cause. If the UE is located outside the geographical or topological service area of the EAS, the EES does not need to include the EAS in an EAS discovery response message.

Step 403: The EES sends the EAS discovery response message to the EEC.

If the EAS discovery request of the EEC is successfully processed, the EAS discovery response message includes information about the one or more discovered EASs and endpoint information of the one or more discovered EASs. If the EAS discovery request of the EEC fails to be processed, the EAS discovery response message includes a failure indication and a failure cause.

In an example, Table 6 shows information elements that may be included in the EAS discovery response message.

TABLE 6

| Information element | State | Descriptions |
|---|---|---|
| Success response | Optional | Indicate that the EAS discovery request succeeds. |
| List of discovered EASs | Optional | List of discovered EASs |

TABLE 6-continued

| Information element | State | Descriptions |
|---|---|---|
| EAS profile | Mandatory | EAS profile |
| Life cycle | Optional | Time interval or duration in which an information element in the EAS profile is valid and needs to be buffered in the EEC (for example, a lifetime value of an EAS endpoint) |
| Failure response | Optional | EAS discovery request fails. |
| Cause | Optional | Failure cause of the EAS discovery request |

Figure 5:
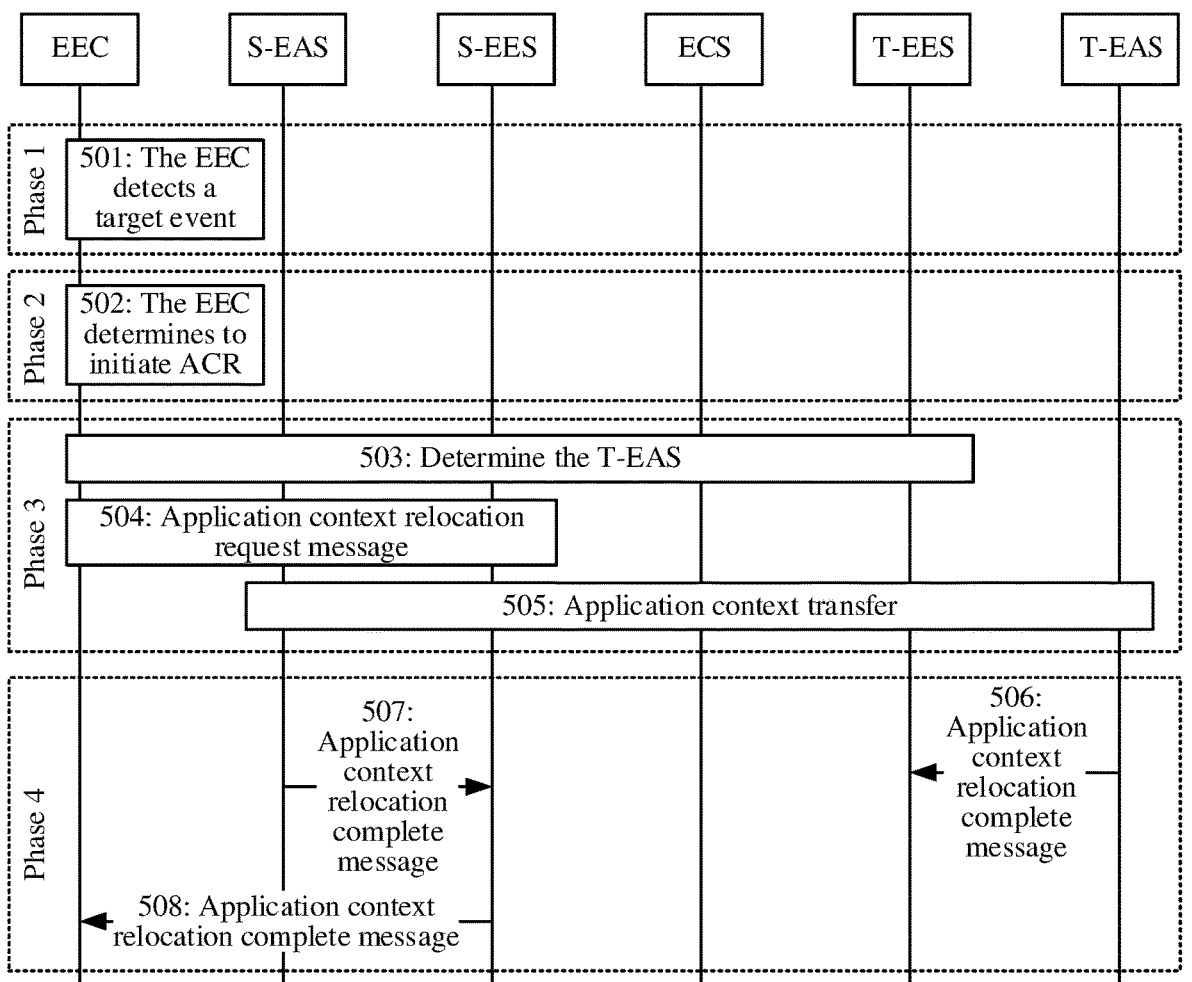
FIG. 5 is another implementation of application context relocation.

FIG. 5 is another implementation of application context relocation.

In this implementation, an EEC performs ACR by using an S-EES.

Step 501: The EEC detects a target event.

The target event may include a UE location change, a UE user plane path update, and the like.

Step 502: The EEC determines to trigger the application context relocation.

Step 503: The EEC determines a T-EAS.

Step 504: The EEC sends an application context relocation request to the S-EES.

Step 505: The S-EES indicates an S-EAS to transmit an application context, and the S-EAS transfers the application context with the T-EAS.

Step 506: After the application context is transferred, the T-EAS sends an application context relocation complete message to a T-EES, to indicate the T-EES that the application context is transferred, and indicate an application context transfer result.

Step 507: After the application context is transferred, the S-EAS sends an application context relocation complete message to the S-EES, to indicate the T-EES that the application context is transferred, and indicate the application context transfer result.

Step 508: After receiving the application context relocation complete message sent by the S-EAS, the S-EES sends the application context relocation complete message to the EEC, to indicate the EEC that the application context is transferred.

It can be learned that, in the implementation shown in FIG. 5, the EEC detects, decides, and determines the T-EES and the T-EAS, the EEC requests the S-EES to initiate a user plane path modification, and the S-EES initiates the transfer of the application context. For more specific descriptions of the phases shown in FIG. 5, refer to related descriptions in FIG. 2. Details are not described herein again. Different from the implementation shown in FIG. 2, the S-EES initiates the transfer of the application context.

Figure 6:
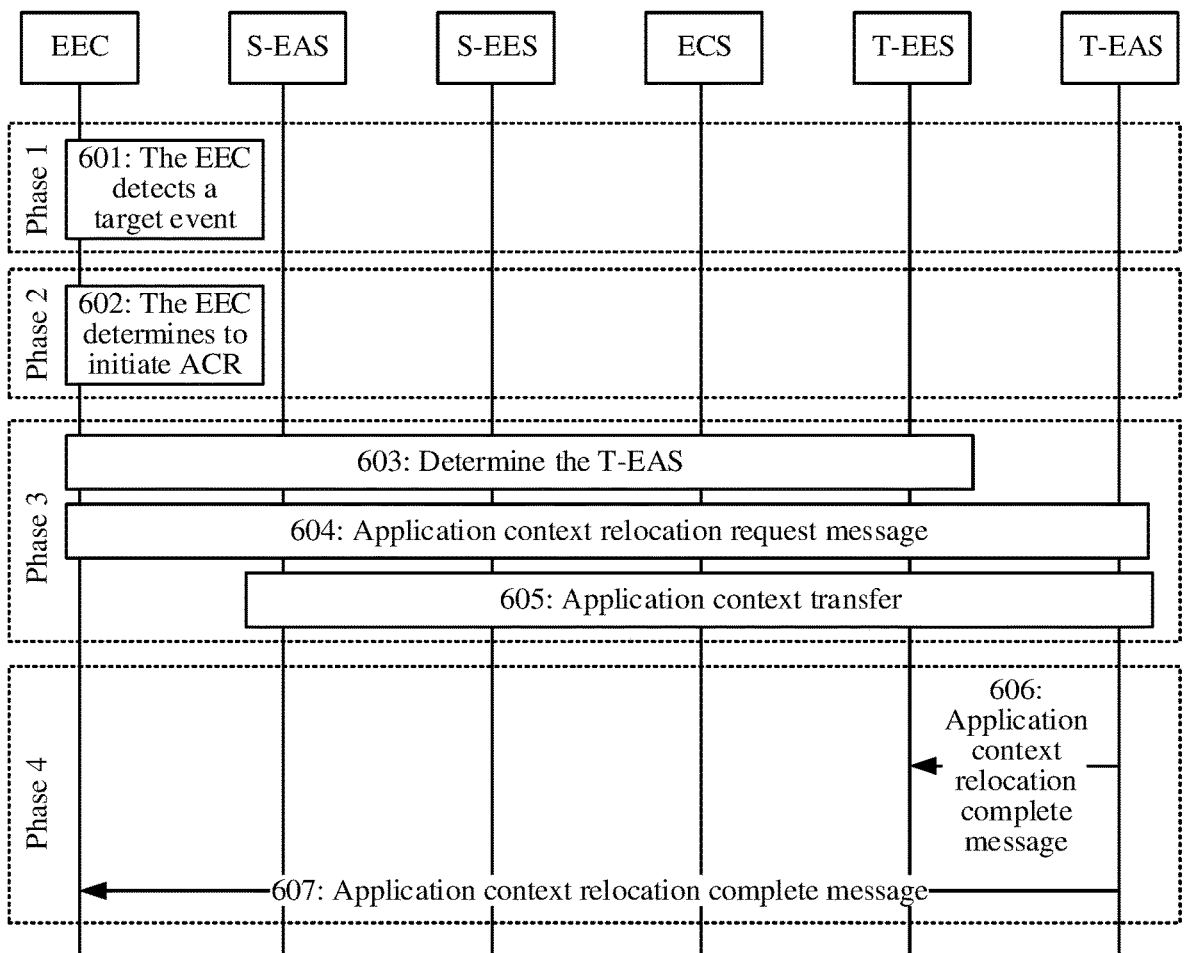
FIG. 6 is another implementation of application context relocation.

FIG. 6 is another implementation of application context relocation.

In this implementation, an EEC performs ACR by using a T-EES.

Step 601: The EEC detects a target event.

The target event may include a UE location change, a UE user plane path update, and the like.

Step 602: The EEC determines to trigger the application context relocation.

Step 603: The EEC determines a T-EAS.

Step 604: The EEC sends an application context relocation request to the T-EES.

Step 605: The T-EES indicates the T-EAS to request an application context from an S-EAS, and the S-EAS transfers the application context with the T-EAS.

Step 606: After the application context is transferred, the T-EAS sends an application context relocation complete message to the T-EES, to indicate the T-EES that the application context is transferred, and indicate an application context transfer result.

Step 607: After receiving the application context relocation complete message sent by the T-EAS, the T-EES sends the application context relocation complete message to the EEC, to indicate the EEC that the application context is transferred.

It can be learned that, in the implementation shown in FIG. 6, the EEC detects, decides, and determines the T-EES and the T-EAS, the EEC requests the T-EES to initiate a user plane path modification, and the T-EES indicates the T-EAS to initiate the transfer of the application context. For more specific descriptions of the phases shown in FIG. 6, refer to related descriptions in FIG. 5. Details are not described herein again. Different from the implementation shown in FIG. 5, the T-EES initiates the transfer of the application context.

Figure 7:
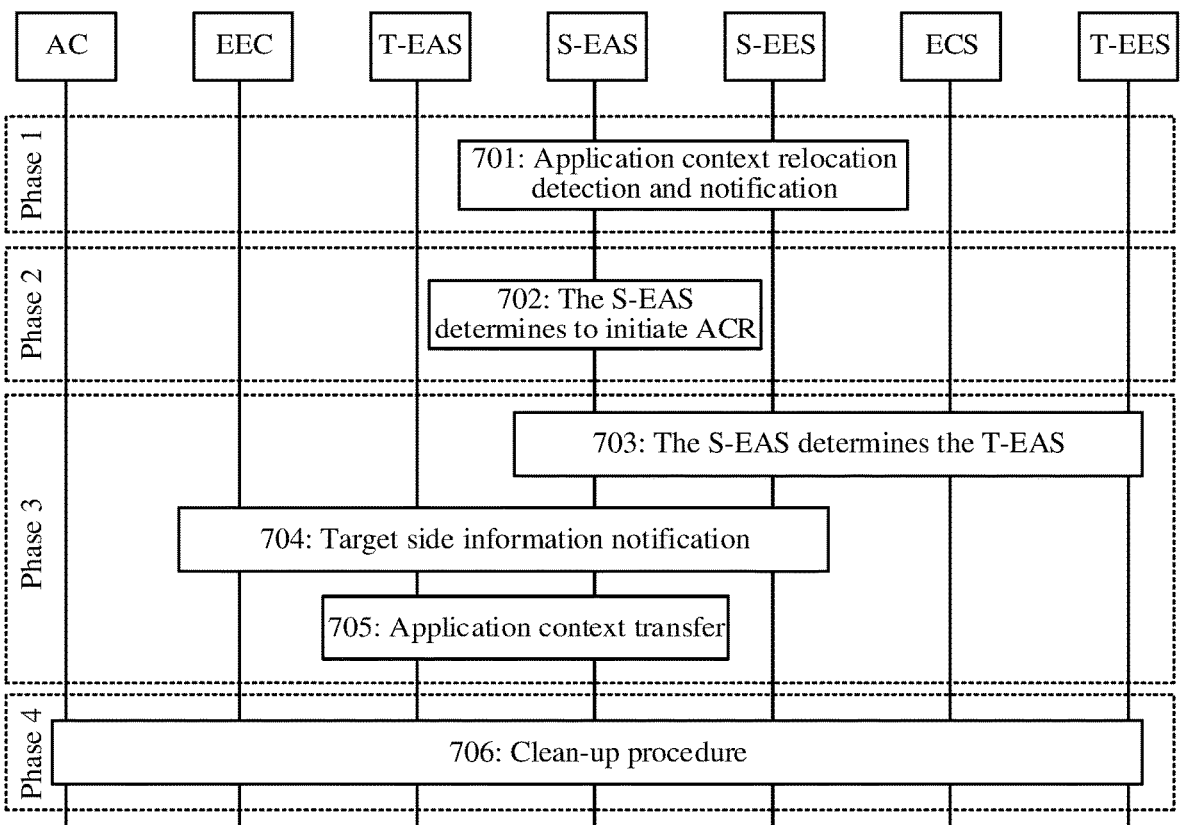
FIG. 7 is another implementation of application context relocation.

FIG. 7 is another implementation of application context relocation.

In this implementation, an S-EAS decides to initiate ACR.

Step 701: The S-EAS detects a target event; or an S-EES detects a target event and notifies the S-EAS of the target event.

The target event may include a UE location change, a UE user plane path update, and the like.

Step 702: The S-EAS determines to initiate the application context relocation.

Step 703: The S-EAS determines a T-EAS.

Step 704: The S-EAS notifies target side information.

Step 705: The S-EAS transfers an application context with the T-EAS.

Step 706: After the application context is transferred, each entity performs a clean-up procedure.

It can be learned that, in the implementation shown in FIG. 7, the S-EAS or the S-EES performs detection, the S-EAS decides and determines the T-EES and the T-EAS, the S-EAS initiates a user plane path modification, and the S-EES initiates the transfer of the application context.

Figure 8:
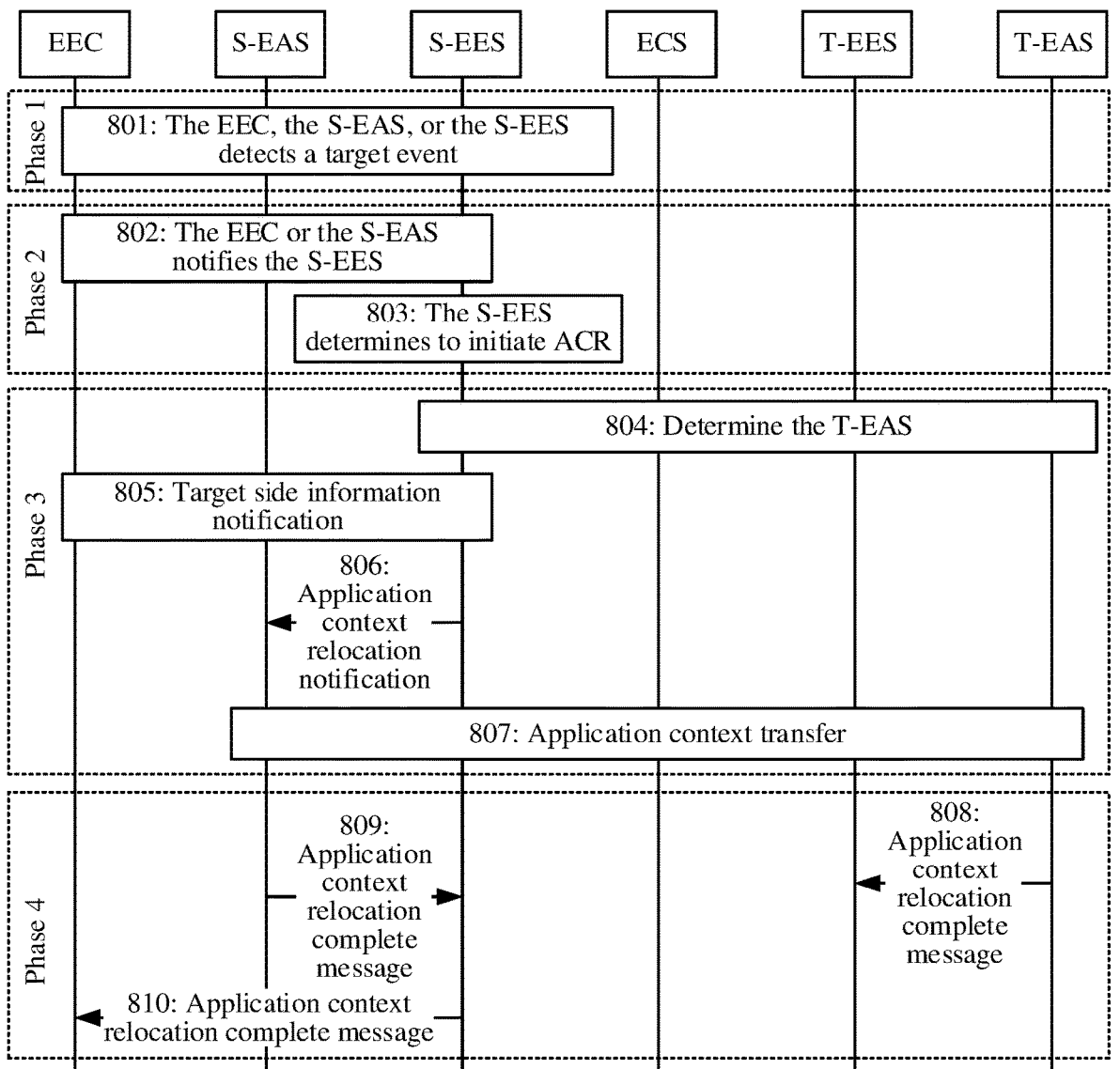
FIG. 8 is another implementation of application context relocation.

FIG. 8 is another implementation of application context relocation.

In this implementation, an S-EES performs ACR.

Step 801: An EEC, an S-EAS, or the S-EES detects a target event.

The target event may include a UE location change, a UE user plane path update, and the like.

Step 802: The EEC or the S-EAS notifies the S-EES that the target event is detected.

This step is an optional step. If the EEC or the S-EAS detects the target event, the EEC or the S-EAS needs to notify the S-EES that the target event is detected.

Step 803: The S-EES determines to initiate the application context relocation.

Step 804: The S-EES determines a T-EAS.

Step 805: The S-EES notifies target side information.

Step 806: The S-EES notifies the S-EAS to perform context relocation.

Step 807: The S-EAS transfers the application context with the T-EAS.

Step 808: After the application context is transferred, the T-EAS sends an application context relocation complete message to a T-EES, to indicate the T-EES that the application context is transferred, and indicate an application context transfer result.

Step 809: After the application context is transferred, the S-EAS sends an application context relocation complete message to the S-EES, to indicate the T-EES that the application context is transferred, and indicate the application context transfer result.

Step 810: After receiving the application context relocation complete message sent by the S-EAS, the S-EES sends the application context relocation complete message to the EEC, to indicate the EEC that the application context is transferred.

It can be learned that, in the implementation shown in FIG. 8, the EEC, the S-EAS, or the S-EES performs detection, the S-EES decides and determines the T-EES and the T-EAS, the S-EES initiates a user plane path modification, and the S-EES notifies the S-EAS to initiate the transfer of the application context.

Figure 9:
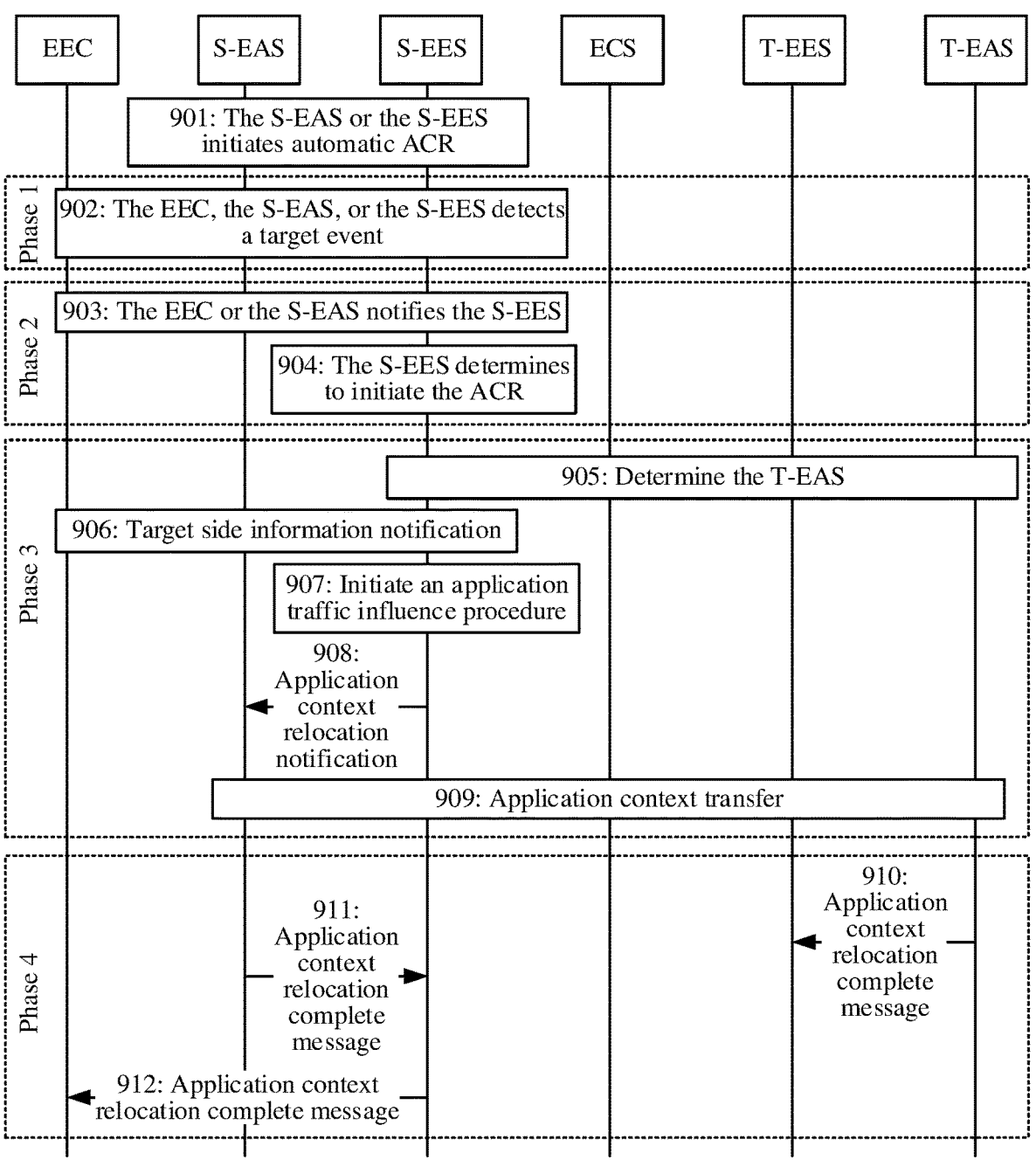
FIG. 9 is another implementation of application context relocation.

FIG. 9 is another implementation of application context relocation.

An ACR mode shown in FIG. 9 is automatic ACR.

Step 901: An S-EAS or an S-EES initiates the automatic ACR.

Step 902: An EEC, the S-EAS, or the S-EES detects a target event.

The target event may include a UE location change, a UE user plane path update, and the like.

Step 903: The EEC or the S-EAS notifies the S-EES that the target event is detected.

This step is an optional step. If the EEC or the S-EAS detects the target event, the EEC or the S-EAS needs to notify the S-EES that the target event is detected.

Step 904: The S-EES determines to initiate the application context relocation.

Step 905: The S-EES determines a T-EAS.

Step 906: The S-EES notifies target side information.

Step 907: The S-EES notifies the S-EAS to perform context relocation.

Step 908: The S-EES performs an application traffic influence procedure.

Step 909: The S-EAS transfers an application context with the T-EAS.

Step 910: After the application context is transferred, the T-EAS sends an application context relocation complete message to a T-EES, to indicate the T-EES that the application context is transferred, and indicate an application context transfer result.

Step 911: After the application context is transferred, the S-EAS sends an application context relocation complete message to the S-EES, to indicate the T-EES that the application context is transferred, and indicate the application context transfer result.

Step 912: After receiving the application context relocation complete message sent by the S-EAS, the S-EES sends the application context relocation complete message to the EEC, to indicate the EEC that the application context is transferred.

It can be learned that, in the implementation shown in FIG. 9, the EEC, the S-EAS, or the S-EES performs detection, the S-EES decides and determines the T-EES and the T-EAS, the S-EES initiates a user plane path modification, and the S-EES notifies the S-EAS to initiate the transfer of the application context.

Based on the procedures in FIG. 2 to FIG. 9, the application context can be relocated. However, in a service continuity scenario, an EEC context also needs to be relocated, to synchronize registration data and subscription data of a terminal and subscription information of an EAS corresponding to an AC on the terminal. Currently, in an application context relocation procedure, application context relocation and EEC context relocation are not coordinated, and the application context relocation and the EEC context relocation are independent of each other. Therefore, the application context relocation and the EEC context relocation may be asynchronous. As a result, the application context may be relocated to a target EAS. However, service subscription information, EEC registration information, and EEC subscription information required by the EAS have not been relocated to the target side. Consequently, there may be a lack of necessary subscription information during application running. This prolongs duration of suspension or interruption of an application service and affects transfer of the application service.

Therefore, how to optimize application context and EEC context relocation procedures in a service continuity scenario becomes a problem that needs to be urgently resolved.

For the foregoing problem, this application provides a context transfer method, to help reduce duration of suspension or interruption of an application service in an edge application server switching process, so as to improve transfer continuity of the application service.

Figure 10:
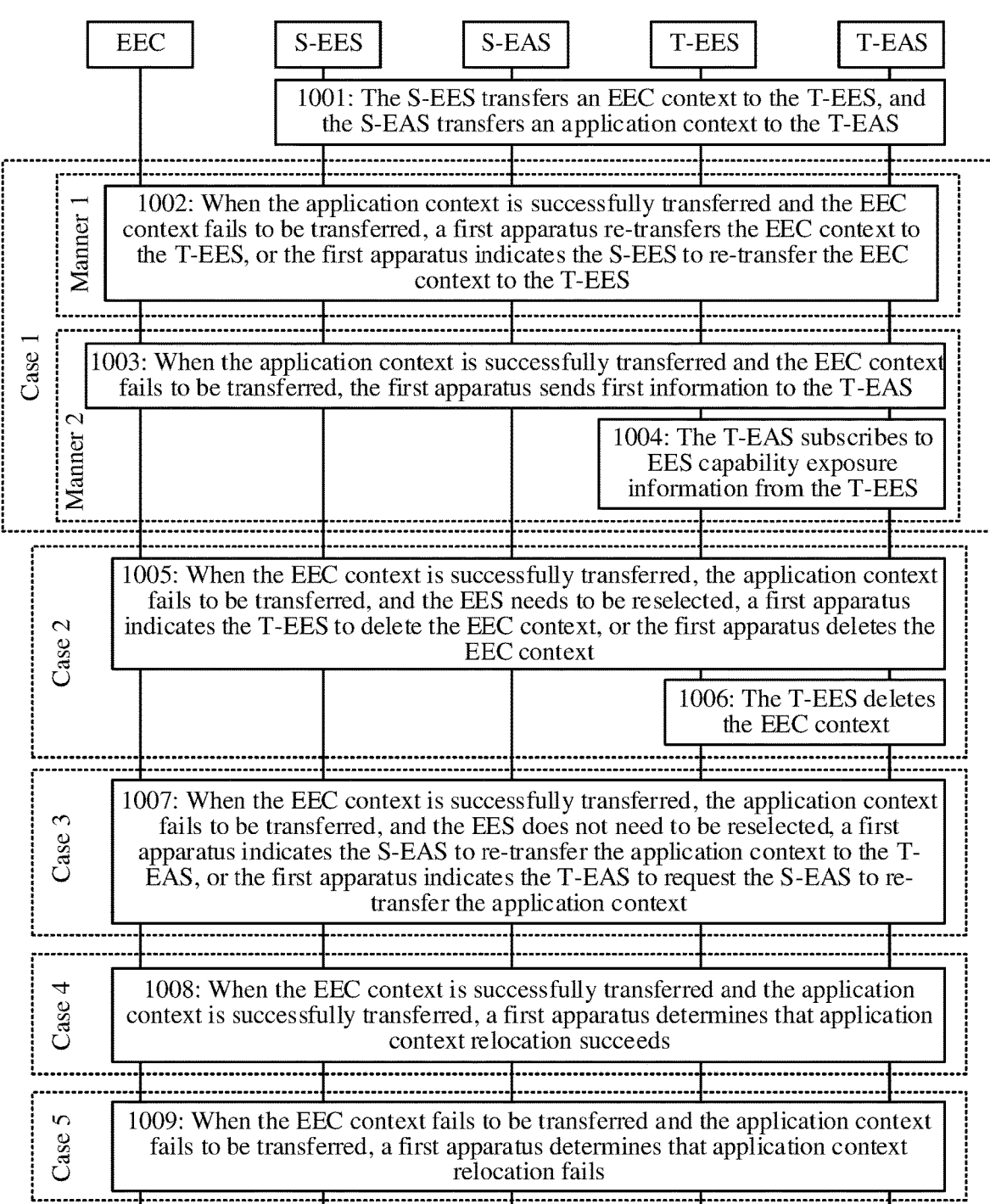
FIG. 10 is a schematic flowchart of a context transfer method according to this application.

FIG. 10 is a schematic flowchart of a context transfer method according to this application. The method shown in FIG. 10 may be performed by an EEC, an S-EAS, an S-EES, a T-EAS, and a T-EES, or may be performed by modules or units in the EEC, the S-EAS, the S-EES, the T-EAS, and the T-EES. The following describes the technical solutions of this application by using an EEC, an S-EAS, an S-EES, a T-EAS, and a T-EES as execution bodies. The method shown in FIG. 10 may include at least a part of the following content.

Step 1001: The S-EES transfers an EEC context to the T-EES, and the S-EAS transfers an application context to the T-EAS.

In some implementations, when relocation of the application context is initiated, the EEC context is transferred between the S-EES and the T-EES, and the application context is transferred between the S-EAS and the T-EAS.

In an example, when the relocation of the application context is initiated, the S-EES initiates transfer of the EEC context and the application context. Specifically, the S-EES determines the T-EES and the T-EAS associated with the T-EES; the S-EES transfers the EEC context to the T-EES; and the S-EES indicates the S-EAS associated with the S-EES to send the application context to the T-EAS, or the S-EES sends, to the T-EES, the application context obtained from the S-EAS.

In another example, when the relocation of the application context is initiated, the T-EES initiates transfer of the EEC context and the application context. Specifically, the T-EES determines the S-EES and the S-EAS associated with the S-EES; the T-EES requests the EEC context from the S-EES; and the T-EES indicates the T-EAS to request the application context from the S-EAS, or the T-EES requests the application context from the S-EES.

A decision node that initiates the relocation of the application context is not limited in this application. For example, the decision node may be the EEC in FIG. 2, FIG. 5, or FIG. 6; or may be the S-EES or the S-EAS in FIG. 7 and FIG. 9; or may be the EEC, the S-EES, or the S-EAS in FIG. 8. In an example, the S-EES may initiate transfer of the EEC context and the application context after detecting a target event and determining to initiate the ACR. In another example, after receiving sixth information sent by the EEC, the S-EES or the T-EES may initiate transfer of the EEC context and the application context, where the sixth information indicates to initiate the transfer of the application context and the EEC context.

A manner in which the EES (for example, the S-EES or the T-EES) determines the T-EES and the T-EAS is not limited in this application. For example, the S-EES may determine the T-EES and the T-EAS by using a target EAS discovery (discovery target EAS) procedure. Specifically, the S-EAS sends an EAS discovery request message to the S-EES, the S-EES requests to obtain the T-EES from an ECS, and the S-EES discovers the T-EAS via the T-EES. For another example, the T-EES and the T-EAS may be indicated to the EES after being discovered and selected by another apparatus.

In this application, transfer results of the EEC context and the application context are different, and subsequent to-be-performed steps may be different.

Case 1: The application context is successfully transferred, and the EEC context fails to be transferred.

For the case 1, there may be the following two processing manners.

Manner 1: Step 1002

Step 1002: A first apparatus re-transfers the EEC context to the T-EES, or the first apparatus indicates the S-EES to re-transfer the EEC context to the T-EES.

For example, when the first apparatus is an EEC, the EEC may directly send the indication information to the S-EES, or the EEC may send the indication information to the S-EES through the S-EES and the T-EES.

For another example, when the first apparatus is an S-EES, the S-EES may re-transfer the EEC context to the T-EES.

For another example, when the first apparatus is a T-EES, the T-EES may request the S-EES to re-transfer the EEC context.

Manner 2: Steps 1003 and 1004

Step 1003: The first apparatus sends first information to the T-EAS.

The first information is used by the T-EAS to subscribe to EES capability exposure information from the T-EES.

Optionally, the EES capability exposure information includes at least one of the following information: a UE location API, an application context relocation event, an AC information exposure API, a UE identifier API, and a QoS session API.

Optionally, the first information may directly or indirectly indicate the T-EAS to subscribe to the EES capability exposure information from the T-EES. For example, the first information includes EEC context transfer failure notification information, and the EEC context transfer failure notification information notifies the T-EAS that the EEC context fails to be transferred. For another example, the first information includes first indication information, and the first indication information indicates the T-EAS to subscribe to the EES capability exposure information from the T-EES.

For another example, the first information includes EEC context transfer failure notification information and application context transfer success notification information, where the EEC context transfer failure notification information notifies the EEC that the EEC context fails to be transferred, and the application context transfer success notification information notifies the EEC that the application context is successfully transferred.

Optionally, the first information may further indicate a service that needs to be subscribed to.

Step 1004: After receiving the first information of the first apparatus, the T-EAS may subscribe to the EES capability exposure information from the T-EES.

In some implementations, the T-EAS may determine, based on the service that needs to be subscribed to and that is indicated by the first information and/or based on an application service requirement, the service that needs to be subscribed to, and subscribe to the service from the T-EES.

Optionally, the first apparatus may be an EEC, an S-EES, or a T-EES.

Optionally, in the manner 2, if the first apparatus is the S-EES or the T-EES, the first apparatus may further send second information to the EEC. The second information is used by the EEC to initiate registration with the T-EES. After receiving the second information, the EEC may initiate registration with the T-EES based on the second information. If the first apparatus is the EEC, the first apparatus may further initiate registration with the T-EES.

The second information may directly or indirectly indicate the EEC to initiate registration with the T-EES. For example, the second information includes the EEC context transfer failure notification information, and the EEC context transfer failure notification information notifies the EEC that the EEC context fails to be transferred. For another example, the second information includes the EEC context transfer failure notification information and the application context transfer success notification information, where the EEC context transfer failure notification information notifies the EEC that the EEC context fails to be transferred, and the application context transfer success notification information notifies the EEC that the application context is successfully transferred. For another example, the second information includes second indication information, and the second indication information indicates the EEC to initiate registration with the T-EES.

Optionally, in the manner 2, if the first apparatus is the S-EES or the T-EES, the first apparatus may further send third information to the EEC. The third information is used by the EEC to subscribe to the required service from the T-EES. After receiving the third information, the EEC may subscribe to the required service from the T-EES based on the third information. If the first apparatus is the EEC, the first apparatus may further subscribe to the required service from the T-EES. Optionally, the EEC may subscribe to, from the T-EES, a service related to EAS discovery or EAS information, or subscription information of Edge-1 (that is, between the EEC and the EES), for example, an EAS availability change or an EAS dynamic information change.

The third information may directly or indirectly indicate the EEC to subscribe to an EAS discovery and/or EAS information service from the T-EES. For example, the third information includes the EEC context transfer failure notification information, and the EEC context transfer failure notification information notifies the EEC that the EEC context fails to be transferred. For another example, the third information includes the EEC context transfer failure notification information and the application context transfer success notification information, where the EEC context transfer failure notification information notifies the EEC that the EEC context fails to be transferred, and the application context transfer success notification information notifies the EEC that the application context is successfully transferred. For another example, the third information includes third indication information, and the third indication information indicates the EEC to subscribe to the EAS discovery and/or EAS information service from the T-EES.

Case 2: The application context fails to be transferred, the EES needs to be reselected, and the EEC context is successfully transferred.

The EEC context transferred to the T-EES is meaningless because the EES needs to be reselected. Therefore, for the case 2, steps 1005 and 1006 may be performed.

Step 1005: A first apparatus indicates the T-EES to delete the EEC context, or the first apparatus deletes the EEC context.

For example, when the first apparatus is an EEC or an S-EES, the first apparatus may indicate the T-EES to delete the EEC context.

For another example, when the first apparatus is a T-EES, the T-EES may delete the EEC context.

Step 1006: The T-EES may delete the EEC context.

Case 3: The application context fails to be transferred, the EES does not need to be reselected, and the EEC context is successfully transferred.

The EEC context transferred to the T-EES can still be used because the EES does not need to be reselected. Therefore, for the case 3, step 1007 may be performed.

Step 1007: A first apparatus indicates the S-EAS to re-transfer the application context to the T-EAS, or the first apparatus indicates the T-EAS to request the S-EAS to re-transfer the application context.

The first apparatus may directly indicate the S-EAS to re-transfer the application context to the T-EAS; or may indirectly indicate, through another apparatus, the S-EAS to re-transfer the application context to the T-EAS. For example, the first apparatus may indicate the T-EAS to request the S-EAS to re-transfer the application context, and the T-EAS requests the S-EAS to re-transfer the application context, so as to indicate the S-EAS to re-transfer the application context to the T-EAS.

For example, when the first apparatus is an EEC, the EEC may send the indication information to the S-EAS through the S-EES, or the EEC may send the indication information to the S-EAS through the S-EES, the T-EES, and the T-EAS.

For another example, when the first apparatus is an S-EES, the S-EES may directly send the indication information to the S-EAS, or the S-EES may send the indication information to the S-EAS through the T-EES and the T-EAS.

For another example, when the first apparatus is a T-EES, the T-EES may send the indication information to the S-EAS through the T-EAS, or the T-EES may send the indication information to the S-EAS through the S-EES.

When the first apparatus is the S-EES, in another possible implementation, the S-EES may alternatively obtain the application context from the S-EAS, and re-transfer the application context to the T-EAS through the T-EES.

Case 4: The application context is successfully transferred and the EEC context is successfully transferred.

For the case 4, step 1009 may be performed.

Step 1007: The first apparatus determines that the application context relocation succeeds.

Optionally, the first apparatus may be an EEC, an S-EES, or a T-EES.

Optionally, if the first apparatus is the S-EES or the T-EES, the first apparatus may further send indication information to the EEC, to indicate that the application context relocation succeeds.

Case 5: The application context fails to be transferred and the EEC context fails to be transferred.

For the case 5, step 1010 may be performed.

Step 1007: A first apparatus determines that the application context relocation fails.

Optionally, the first apparatus may be an EEC, an S-EES, or a T-EES.

Optionally, if the first apparatus is the S-EES or the T-EES, the first apparatus may further send indication information to the EEC, to indicate that the application context relocation fails.

A manner in which the first apparatus determines the transfer results of the application context and the EEC context is not specifically limited in this application.

In an example, when the first apparatus is the S-EES, the S-EES may determine the transfer result of the EEC context based on a feedback of the T-EES, and the S-EES may determine the transfer result of the application context based on a feedback of the S-EAS or a feedback of the T-EES.

In another example, when the first apparatus is the T-EES, for a case in which the T-EES requests the EEC context from the S-EES, if the T-EES does not receive the EEC context from the S-EES, the T-EES determines that the EEC context fails to be transferred.

For still another example, when the first apparatus is the EEC, the EEC receives fifth information from the S-EES or the T-EES, where the fifth information indicates the transfer result of the EEC context; and the EEC determines the transfer result of the EEC context based on the fifth information.

In this way, according to the technical solution shown in FIG. 2, the transfer of the application context and the EEC context can be completed at the same time when the relocation of the application context is initiated. This helps reduce duration of suspension or interruption of an application service in an edge application server switching process, so as to improve transfer continuity of the application service.

The following describes the technical solutions of this application in detail with reference to specific examples.

Example 1

Figure 11A:
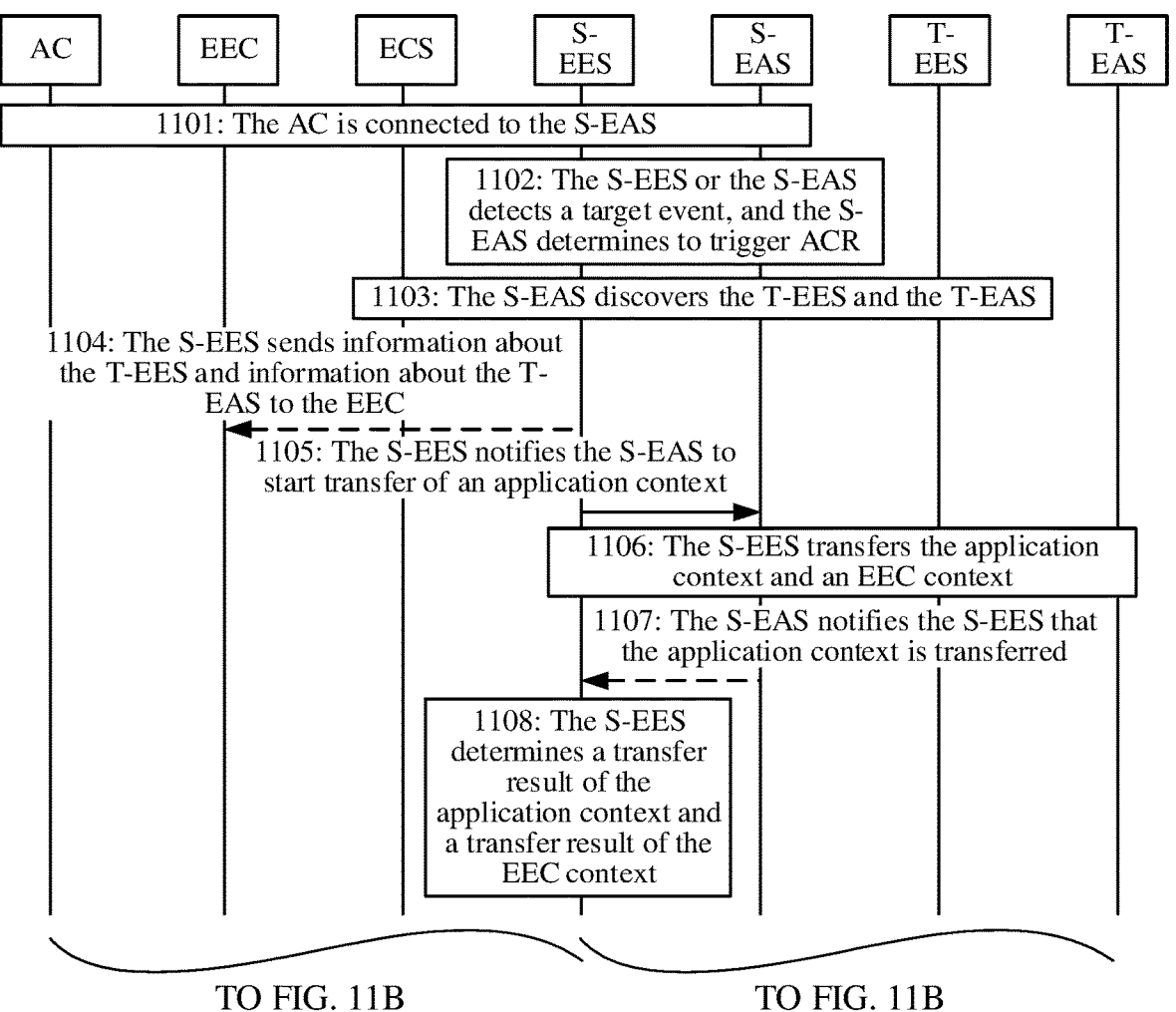
FIG. 11A and FIG. 11B are an example of a context transfer method according to this application.
Figure 11B:
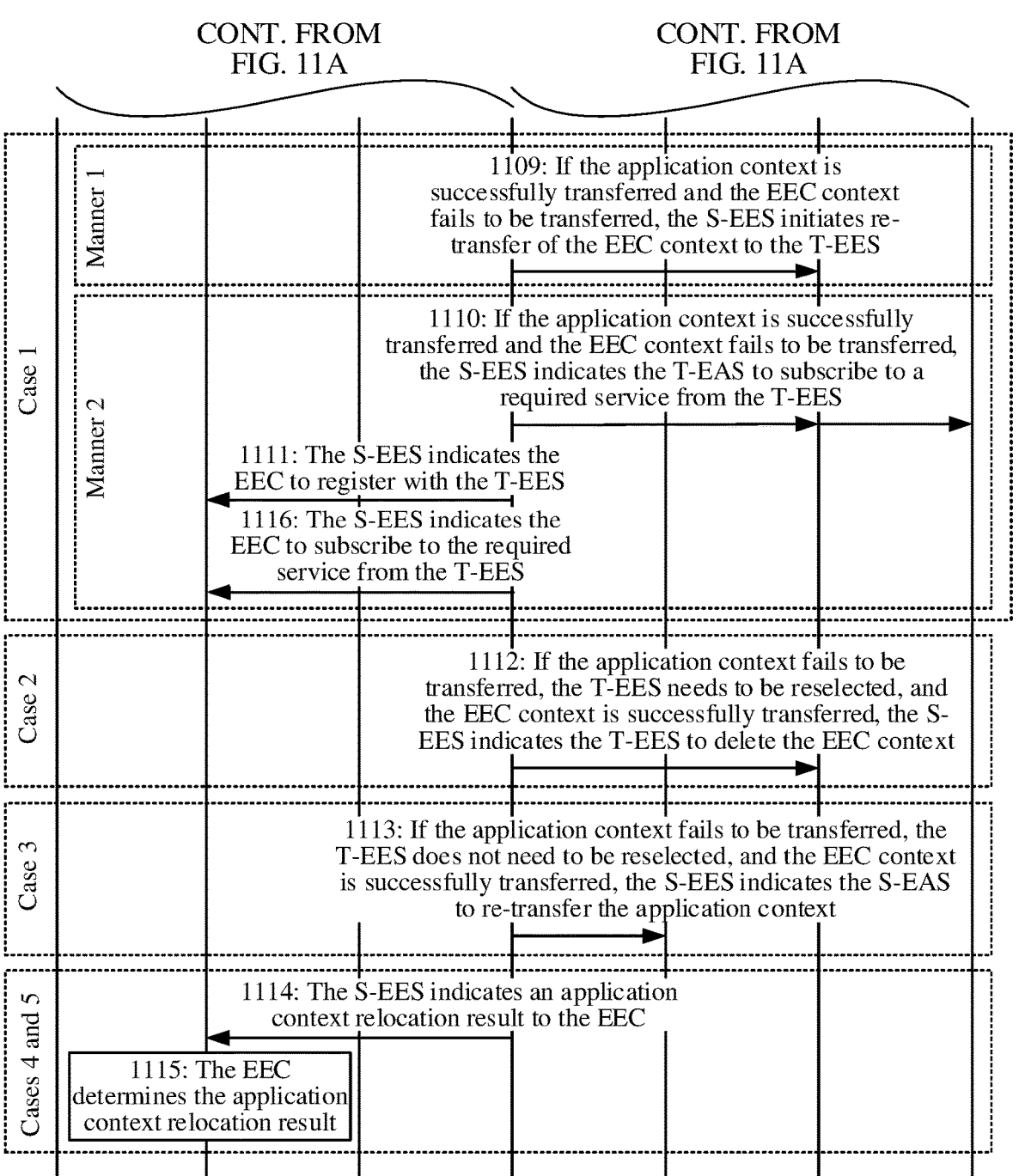

FIG. 11A and FIG. 11B are an example of a context transfer method according to this application.

In this example, an AC is connected to a source EAS (S-EAS), a source EES (S-EES) or the S-EAS detects a target event, the S-EAS triggers ACR, and the S-EES determines a subsequent procedure based on a transfer result of an application context and a transfer result of an EEC context.

Step 1101: The AC is connected to the S-EAS, and an application runs on the S-EAS.

Step 1102: After the S-EES or the S-EAS detects the target event, the S-EAS determines to trigger an ACR procedure, to perform context relocation for the application.

Step 1103: The S-EAS performs a target EAS discovery (discovery target EAS) procedure via the S-EES and an ECS, the S-EES discovers a T-EES via the ECS, and the T-EES sends a discovered T-EAS profile to the S-EAS through the S-EES.

Step 1104: The S-EES sends target side information to an EEC.

One possible implementation is that the S-EES sends information about the T-EES and a T-EAS to the EEC by sending a target information notification message to the EEC. In this case, the EEC may obtain the discovered T-EES and T-EAS.

Step 1105: The S-EES sends an application context relocation notification to the S-EAS, to indicate the S-EAS to start transfer of the application context.

Step 1106: The S-EES transfers the application context and the EEC context.

Specifically, the S-EES sends the EEC context to the T-EES, and the S-EAS sends the application context to the T-EAS. Alternatively, the S-EES obtains the application context from the S-EAS, and sends the EEC context and the obtained application context to the T-EES. After receiving the application context, the T-EES sends the application context to the T-EAS.

Step 1107: After detecting that the application context is transferred, the S-EAS notifies the S-EES that the application context is transferred, and sends a transfer result to the S-EES.

This step is optional.

One possible implementation is that the S-EAS sends an application context transfer complete message to the S-EES, where the application context transfer complete message may carry the transfer result. If the transfer result indicates that the transfer fails, the application context transfer complete message may further carry a failure cause. In an example, Table 7 shows information elements that may be included in the application context transfer complete message.

TABLE 7

| Information element | State | Descriptions |
|---|---|---|
| Result | Optional | Indicate the transfer result of the application context. |
| Cause | Optional | Indicate the failure cause of the application context transfer. |

Step 1108: The S-EES determines the transfer results of the application context and the EEC context.

In a possible implementation, the S-EES may determine the transfer result of the EEC context based on a feedback of the T-EES. The S-EES may determine the transfer result of the application context based on a feedback of the S-EAS.

Optionally, the feedback of the S-EAS may be the application context transfer complete message sent by the S-EAS to the S-EES in step 1107.

Optionally, the feedback of the T-EES may be an EEC context transfer complete (EEC context transfer complete) message sent by the T-EES to the S-EES. In an example, Table 8 shows information elements that may be included in the EEC context transfer complete message.

TABLE 8

| Information element | State | Descriptions |
|---|---|---|
| Result | Optional | Indicate the transfer result of the EEC context. |
| Cause | Optional | Indicate a failure cause of the EEC context transfer. |

In another possible implementation, if the application context is transferred from the S-EES to the T-EES and then to the T-EAS, the S-EES may determine the transfer result of the EEC context and the transfer result of the application context based on a feedback from the T-EES.

Optionally, the feedback of the T-EES may include an EEC context transfer complete message and an application context transfer complete message. In an example, Table 9 shows information elements that may be included in the feedback of the T-EES.

TABLE 9

| Information element | State | Descriptions |
|---|---|---|
| EEC context transfer complete | Optional | Indicate that the EEC context is transferred. |
| Result | Optional | Indicate the transfer result of the EEC context. |
| Cause | Optional | Indicate a failure cause of the EEC context transfer. |
| Application context transfer complete | Optional | Indicate that the application context is transferred. |
| Result | Optional | Indicate the transfer result of the application context. |
| Cause | Optional | Indicate a failure cause of the application context transfer. |

Based on the transfer results of the application context and the EEC context, a subsequent procedure may include the following several cases.

Case 1: The application context is successfully transferred, and the EEC context fails to be transferred.

For the case 1, there may be the following two processing manners.

Manner 1: Step 1109

Step 1109: The S-EES re-transfers the EEC context to the T-EES, or the S-EES initiates re-transfer of the EEC context to the T-EES.

Manner 2: Steps 1110 and 1111

Step 1110: The S-EES indicates the T-EAS to subscribe to a required service from the T-EES.

A manner in which the S-EES indicates the T-EAS is not specifically limited in this application.

In an example, the S-EES may indicate, through the T-EES, the T-EAS to subscribe to the required service from the T-EES.

For example, the indication sent by the S-EES is transparently transferred or forwarded by the T-EES to the T-EAS.

For another example, the S-EES may indicate, to the T-EES, that the T-EAS needs to subscribe to a required service from the T-EES, and the T-EES further indicates the T-EAS to subscribe to the required service from the T-EES.

The required service herein may be a service in the foregoing EES capability exposure information.

After receiving the instruction from the S-EES, the T-EAS may subscribe to the required service from the T-EES.

Step 1111: The S-EES indicates the EEC to register with the T-EES. This step is optional.

After receiving the indication from the S-EES, the EEC may initiate registration with the T-EES. For a specific indication manner, refer to related descriptions in FIG. 10.

Case 2: The application context fails to be transferred, the EES needs to be reselected, and the EEC context is successfully transferred.

The EEC context transferred to the T-EES is meaningless because the EES needs to be reselected. Therefore, for the case 2, step 1112 may be performed.

Step 1112: The S-EES indicates the T-EES to delete the EEC context.

The T-EES deletes the EEC context after receiving the indication from the S-EES.

Optionally, in the manner 2, step 1116 may be further performed.

Step 1116: The S-EES indicates the EEC to subscribe to the required service from the T-EES. For a specific indication manner, refer to related descriptions in FIG. 10.

Optionally, the EEC may subscribe to, from the EES, a service related to EAS discovery or EAS information, or subscription information of Edge-1 (that is, between the EEC and the EES), for example, an EAS availability change or an EAS dynamic information change.

After receiving the indication from the S-EES, the EEC may subscribe to the required service from the T-EES.

Case 3: The application context fails to be transferred, the EES does not need to be reselected, and the EEC context is successfully transferred.

The EEC context transferred to the T-EES can still be used because the EES does not need to be reselected. Therefore, for the case 3, step 1113 may be performed.

Step 1113: The S-EES indicates the S-EAS to re-transfer the application context to the T-EAS.

Case 4: The application context is successfully transferred and the EEC context is successfully transferred.

Case 5: The application context fails to be transferred and the EEC context fails to be transferred.

For the cases 4 and 5, steps 1114 and 1115 may be performed.

Step 1114: The S-EES sends an application context relocation complete message to the EEC, indicating an application context relocation result to the EEC.

For the case 4, the application context relocation complete message may indicate that the application context relocation succeeds.

For the case 5, the application context relocation complete message may indicate that the application context relocation fails, and optionally, may carry a failure cause.

Step 1115: After receiving the application context relocation complete message, the EEC determines the application context relocation result. If the application context relocation complete message may indicate that the application context relocation is successful, the EEC determines that the application context relocation succeeds. If the application context relocation complete message may indicate that the application context relocation fails, the EEC determines that the application context relocation fails.

In the example 1, the S-EES initiates and coordinates the transfer of the application context and the EEC context.

Specifically, the S-EES detects or receives the transfer results of the EEC context and the application context. When both the contexts are successfully transferred or fail to be transferred, the S-EES sends an ACR success or failure indication to the EEC. When the EEC context fails to be transferred and the application context is successfully transferred, based on the failure cause, the S-EES initiates EEC context re-transfer or indicates the T-EAS to re-subscribe to the required service from the T-EES. If the ACT fails because the T-EES does not satisfy an application requirement, the T-EES needs to be reselected. The S-EES indicates the T-EES to delete the EEC context. Otherwise, the ACT is performed. In this way, it can be ensured that when the application context relocation occurs, both the application context and the EEC context are relocated to the target side; and when the relocation fails, re-execution of the entire ACR procedure or the EEC context relocation procedure may be avoided, so that a problem of a long latency during interruption of an application service can be avoided.

Example 2

Figure 12:
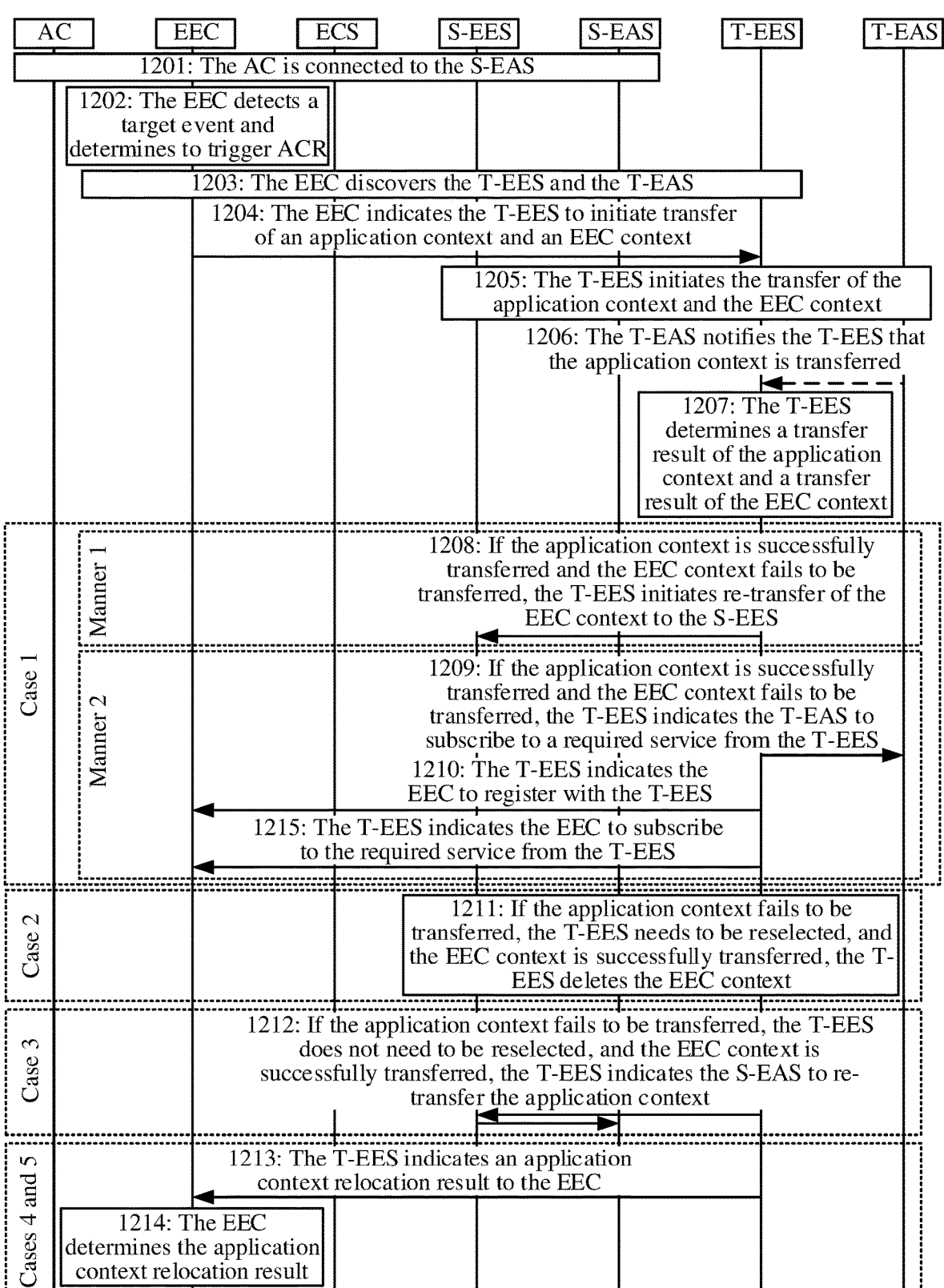
FIG. 12 is another example of a context transfer method according to this application.

FIG. 12 is another example of a context transfer method according to this application.

In this example, an AC is connected to a source EAS (S-EAS), an EEC detects a target event and triggers ACR, and a T-EES determines a subsequent procedure based on a transfer result of an application context and a transfer result of an EEC context.

Step 1201: The AC is connected to the S-EAS, and an application runs on the S-EAS.

Step 1202: After detecting the target event, the EEC determines to trigger an ACR procedure, to perform context relocation for the application.

Step 1203: The EEC performs a service provisioning procedure and an EAS discovery procedure, to determine or discover a T-EES and a T-EAS.

Step 1204: The EEC sends an application context relocation request message to the T-EES.

The application context relocation request message may indicate to initiate transfer of the application context and transfer of the EEC context.

For example, the application context relocation request message may include an application context transfer indication, indicating whether to transmit the application context and whether to transmit the EEC context.

In an example, Table 10 shows information elements that may be included in the application context relocation request message.

TABLE 10

| Information element | State | Descriptions |
| --- | --- | --- |
| EEC ID | Mandatory | Unique identifier of the EEC |
| Security credential | Mandatory | Security credential generated when an edge computing service is successfully authorized |
| UE identifier | Mandatory | Identifier of UE (namely, a GPSI) |
| ACR action | Mandatory | ACR action (ACR initiation or ACR determining) |
| ACR initiation data (note 2) | Optional | ACR initiation IE included in an ACR request message when an ACR action indication is an ACR initiation request |
| T-EAS endpoint | Mandatory | T-EAS endpoint information (for example, a URI, an FQDN, and an IP triplet) |
| DNAI of the T-EAS | Optional | DNAI information associated with the T-EAS |
| N6 traffic route requirement | Optional | N6 traffic route information and/or a route profile ID that correspond/corresponds to the T-EAS DNAI |

TABLE 10-continued

| Information element | State | Descriptions |
|---|---|---|
| EAS notification indication | Mandatory | Whether to notify the EAS that ACR is required |
| S-EAS endpoint | Optional | S-EAS endpoint information |
| Context transfer indication (context transfer indication) | Optional | Indicate the EES to initiate transfer of the application context and/or the EEC context. |
| Application context transfer initiation indication (application context transfer initiation indication) | Optional | Indicate the EES to initiate the application context transfer. |
| EEC context transfer initiation indication (EEC context transfer initiation indication) | Optional | Indicate the EES to initiate the EEC context transfer. |
| ACR decision data (note 2) | Optional | ACR determining IE included in an ACR request message when the ACR action indication is an ACR determining request |
| S-EAS endpoint | Mandatory | S-EAS endpoint information |

Step 1205: The T-EES transfers the application context and the EEC context.

Specifically, the T-EES requests the T-EES to send the EEC context to the T-EES, the S-EES sends the EEC context to the T-EES, the T-EAS requests the application context from the S-EAS, and the S-EAS sends the application context to the T-EAS.

Step 1206: After detecting that the application context is transferred, the T-EAS notifies the T-EES that the application context is transferred, and sends a transfer result to the T-EES.

This step is optional.

One possible implementation is that the T-EAS sends an application context transfer complete message to the T-EES, where the application context transfer complete message may carry the transfer result. If the transfer result indicates that the transfer fails, the application context transfer complete message may further carry a failure cause. Information elements that may be included in the application context transfer complete message may be shown in Table 7 above.

Step 1207: The T-EES determines transfer results of the application context and the EEC context.

In a possible implementation, the T-EES may determine the transfer result of the EEC context depending on whether the EEC context is received. The T-EES may determine the transfer result of the application context based on a feedback of the T-EAS.

Optionally, the feedback of the S-EAS may be the application context transfer complete message sent by the T-EAS to the T-EES in step 1206.

Based on the transfer results of the application context and the EEC context, a subsequent procedure may include the following several cases.

Case 1: The application context is successfully transferred, and the EEC context fails to be transferred.

For the case 1, there may be the following two processing manners.

Manner 1: Step 1208

Step 1208: The T-EES requests the S-EES to re-transfer the EEC context.

Manner 2: Steps 1209 and 1210

Step 1209: The T-EES indicates the T-EAS to subscribe to a required service from the T-EES.

The required service herein may be a service in the foregoing EES capability exposure information.

After receiving the indication from the T-EES, the T-EAS may subscribe to the required service from the T-EES.

Step 1210: The T-EES indicates the EEC to register with the T-EES. This step is optional.

After receiving the indication from the T-EES, the EEC may initiate registration with the T-EES. For a specific indication manner, refer to related descriptions in FIG. 10.

Optionally, in the manner 2, step 1215 may be further performed.

Step 1215: The T-EES indicates the EEC to subscribe to the required service from the T-EES. For a specific indication manner, refer to related descriptions in FIG. 10.

Optionally, the EEC may subscribe to, from the T-EES, a service related to EAS discovery or EAS information, or subscription information of Edge-1 (that is, between the EEC and the EES), for example, an EAS availability change or an EAS dynamic information change.

After receiving the indication from the S-EES, the EEC may subscribe to the required service from the T-EES.

Case 2: The application context fails to be transferred, the EES needs to be reselected, and the EEC context is successfully transferred.

The EEC context transferred to the T-EES is meaningless because the EES needs to be reselected. Therefore, for the case 2, step 1211 may be performed.

Step 1211: The T-EES deletes the EEC context.

Case 3: The application context fails to be transferred, the EES does not need to be reselected, and the EEC context is successfully transferred.

The EEC context transferred to the T-EES can still be used because the EES does not need to be reselected. Therefore, for the case 3, step 1212 may be performed.

Step 1212: The T-EES indicates the S-EAS to re-transfer the application context to the T-EAS, or the T-EES initiates re-transfer of the application context to the S-EES.

A manner in which the T-EES indicates the S-EAS is not specifically limited in this application.

In an example, as shown in FIG. 12, the T-EES may indicate, through the S-EES, the S-EAS to re-transfer the application context to the T-EAS.

For example, the indication sent by the T-EES is transparently transferred or forwarded by the S-EES to the S-EAS.

For another example, the T-EES may indicate to the S-EES that the S-EAS needs to initiate re-transfer of the application context, and the S-EES further indicates the S-EAS to initiate re-transfer of the application context to the T-EAS.

Case 4: The application context is successfully transferred and the EEC context is successfully transferred.

Case 5: The application context fails to be transferred and the EEC context fails to be transferred.

For the cases 4 and 5, steps 1213 and 1214 may be performed.

Step 1213: The T-EES sends an application context relocation complete message to the EEC, indicating an application context relocation result to the EEC.

For the case 4, the application context relocation complete message may indicate that the application context relocation succeeds.

For the case 5, the application context relocation complete message may indicate that the application context relocation fails, and optionally, may carry a failure cause.

Step 1214: After receiving the application context relocation complete message, the EEC determines the application context relocation result. If the application context relocation complete message may indicate that the application context relocation is successful, the EEC determines that the application context relocation succeeds. If the application context relocation complete message may indicate that the application context relocation fails, the EEC determines that the application context relocation fails.

In the example 2, the T-EES initiates and coordinates the transfer of the application context and the EEC context. Specifically, the T-EES detects or receives the transfer results of the EEC context and the application context, and after the context fails to be transferred, the T-EES initiates a post-failure processing procedure, to ensure that when the application context relocation occurs, both the application context and the EEC context are relocated to the target side and when the failure occurs, this avoids re-execution of an entire ACR procedure or EEC context relocation procedure, so as to avoid a problem of a long service interruption latency.

Example 3

Figure 13A:
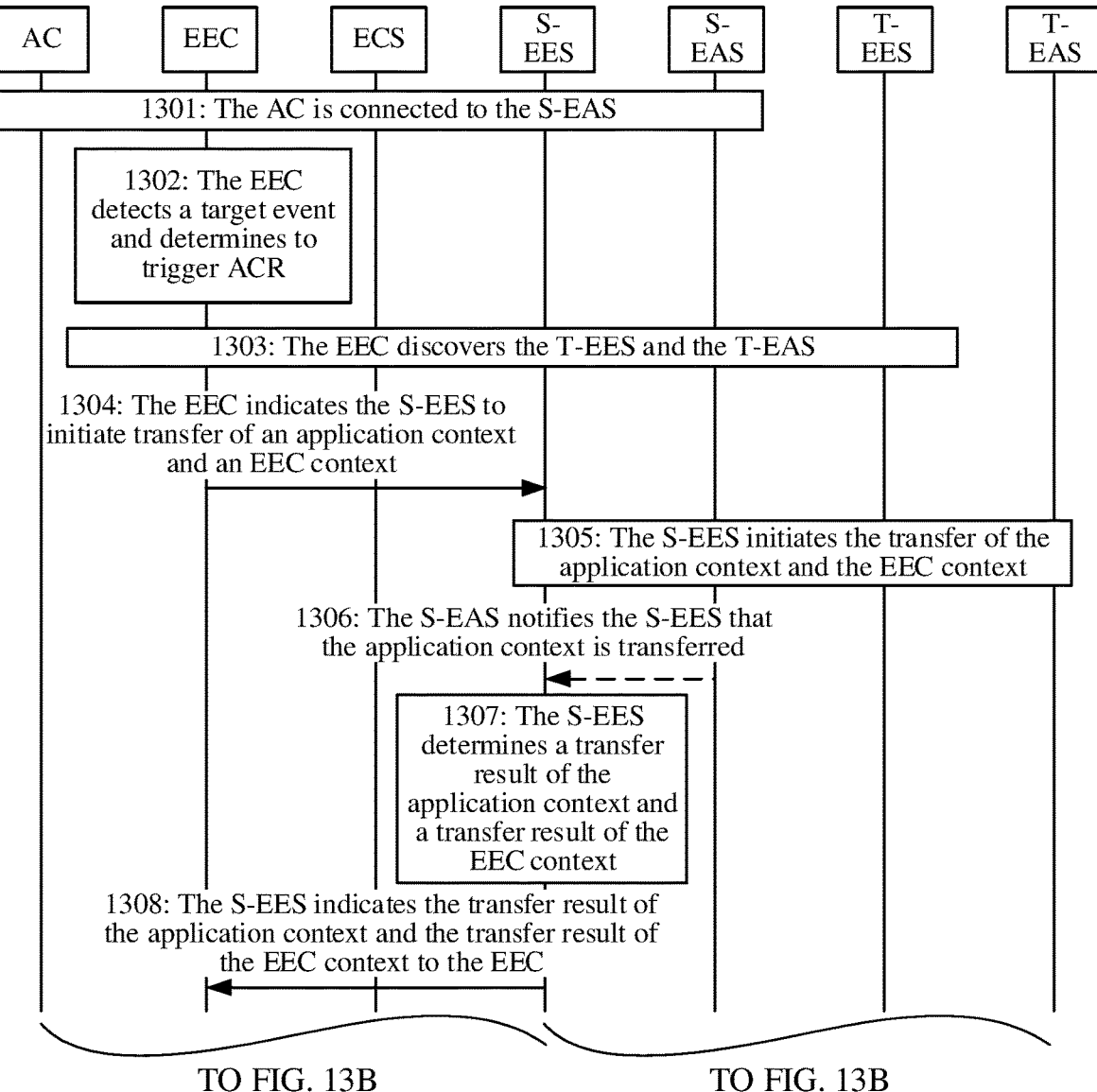
FIG. 13A and FIG. 13B are another example of a context transfer method according to this application.
Figure 13B:
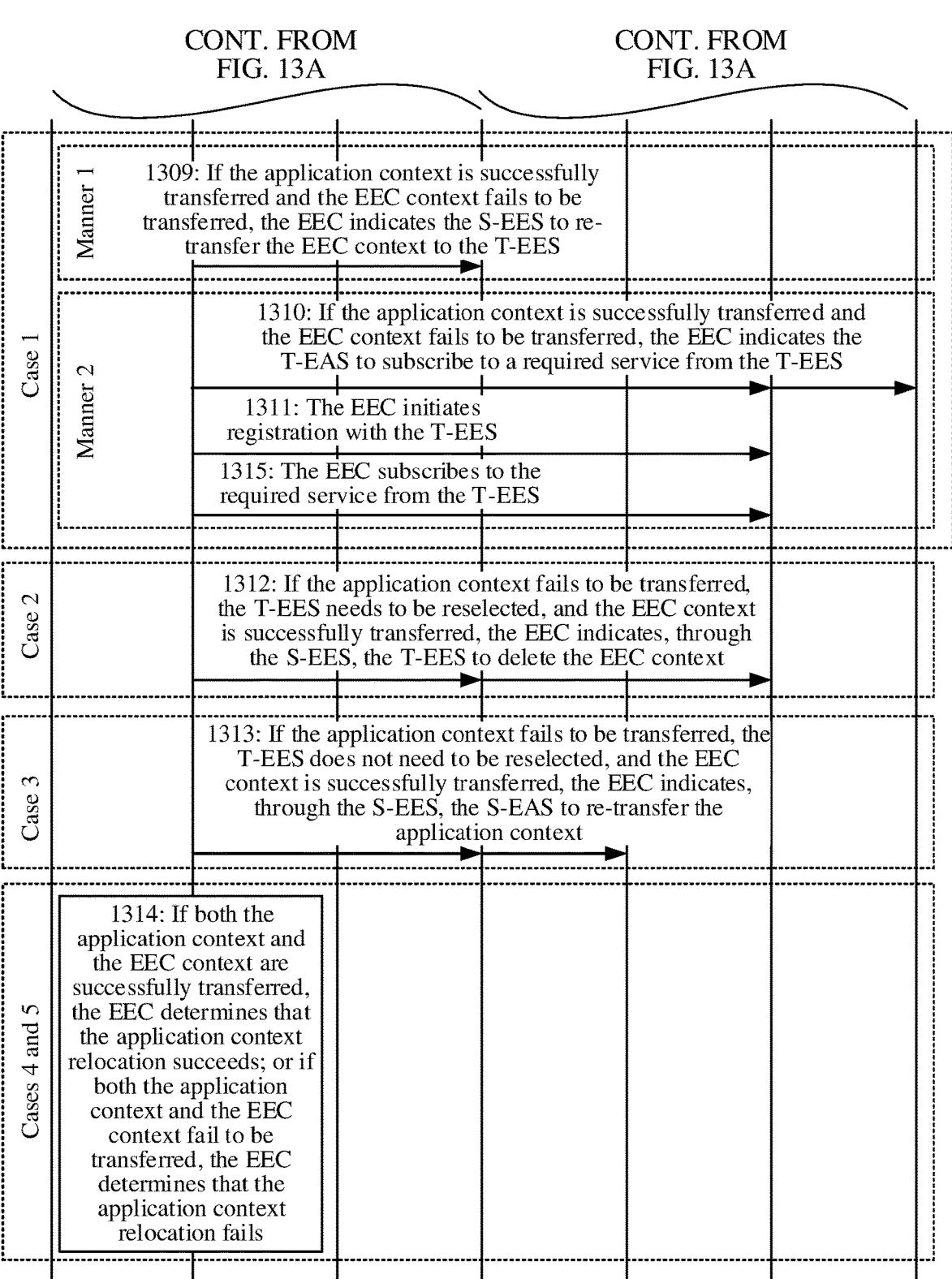

FIG. 13A and FIG. 13B are another example of a context transfer method according to this application.

In this example, an AC is connected to a source EAS (S-EAS), an EEC detects a target event and triggers ACR, and the EEC determines a subsequent procedure based on a transfer result of an application context and a transfer result of an EEC context.

Step 1301: The AC is connected to the S-EAS, and an application runs on the S-EAS.

Step 1302: After detecting the target event, the EEC determines to trigger an ACR procedure, to perform context relocation for the application.

Step 1303: The EEC performs a service provisioning procedure and an EAS discovery procedure, to determine or discover a T-EES and a T-EAS.

Step 1304: The EEC sends an application context relocation request message to the T-EES.

Step 1305: The T-EES transfers the application context and the EEC context.

Steps 1301 to 1305 and steps 1201 to 1205 may be mutually referenced, and details are not described herein again.

Step 1306: After detecting that the application context is transferred, the S-EAS notifies an S-EES that the application context is transferred, and sends a transfer result to the S-EES.

This step is optional.

One possible implementation is that the S-EAS sends an application context transfer complete message to the S-EES, where the application context transfer complete message may carry the transfer result. If the transfer result indicates that the transfer fails, the application context transfer complete message may further carry a failure cause. Information elements that may be included in the application context transfer complete message may be shown in Table 7.

Step 1307: The S-EES determines transfer results of the application context and the EEC context.

Step 1307 and step 1108 may be mutually referenced, and details are not described herein again.

Step 1308: The S-EES indicates the transfer result of the application context and the transfer result of the EEC context to the EEC.

One possible implementation is that the S-EES sends an application context relocation complete message. In an example, Table 11 shows information elements that may be included in the application context relocation complete message.

TABLE 11

| Information element | State | Descriptions |
| --- | --- | --- |
| EEC context transfer complete | Optional | Indicate that the EEC context is transferred. |
| Result | Optional | Indicate the transfer result of the EEC context. |
| Cause | Optional | Indicate a failure cause of the EEC context transfer. |
| Application context transfer complete | Optional | Indicate that the application context is transferred. |
| Result | Optional | Indicate the transfer result of the application context. |
| Cause | Optional | Indicate a failure cause of the application context transfer. |

After receiving the application context relocation complete message, the EEC checks whether the EEC context and the application context are successfully transferred. Based on the transfer results of the application context and the EEC context, a subsequent procedure may include the following several cases.

Case 1: The application context is successfully transferred, and the EEC context fails to be transferred.

For the case 1, there may be the following two processing manners.

Manner 1: Step 1309

Step 1309: The EEC indicates the S-EES to re-transfer the EEC context to the T-EES.

Manner 2: Steps 1310 and 1311

Step 1310: The EEC indicates the T-EAS to subscribe to a required service from the T-EES.

The required service herein may be a service in the foregoing EES capability exposure information.

A manner in which the EEC indicates the T-EAS is not specifically limited in this application.

In an example, the EEC may send the foregoing indication to the T-EAS through the S-EES and the T-EES.

In another example, the EEC may indicate, through the T-EES, the T-EAS to subscribe to the required service from the T-EES.

For example, the indication sent by the EEC is forwarded or transparently transferred by the T-EES to the T-EAS.

For another example, the EEC may indicate, to the T-EES, that the T-EAS needs to subscribe to a required service from the T-EES, and the T-EES further indicates the T-EAS to subscribe to the required service from the T-EES.

Step 1311: The EEC initiates registration with the T-EES. This step is optional.

After receiving the indication from the EEC, the T-EAS may subscribe to the required service from the T-EES.

Optionally, in the manner 2, step 1315 may be further performed.

Step 1315: The EEC subscribes to the required service from the T-EES.

Optionally, the EEC may subscribe to, from the T-EES, a service related to EAS discovery or EAS information, or subscription information of Edge-1 (that is, between the EEC and the EES), for example, an EAS availability change or an EAS dynamic information change.

Case 2: The application context fails to be transferred, the EES needs to be reselected, and the EEC context is successfully transferred.

The EEC context transferred to the T-EES is meaningless because the EES needs to be reselected. Therefore, for the case 2, step 1312 may be performed.

Step 1112: The EEC indicates the T-EES to delete the EEC context.

Optionally, the EEC may send the foregoing indication to the T-EES through the S-EES.

The T-EES deletes the EEC context after receiving the indication from the EEC.

Case 3: The application context fails to be transferred, the EES does not need to be reselected, and the EEC context is successfully transferred.

The EEC context transferred to the T-EES can still be used because the EES does not need to be reselected. Therefore, for the case 3, step 1313 may be performed.

Step 1313: The EEC indicates the S-EAS to re-transfer the application context to the T-EAS.

Optionally, the EEC may send the foregoing indication to the S-EAS through the S-EES.

Case 4: The application context is successfully transferred and the EEC context is successfully transferred.

Case 5: The application context fails to be transferred and the EEC context fails to be transferred.

For the cases 4 and 5, step 1314 may be performed.

Step 1314: The EEC determines an application context relocation result.

For the case 4, the EEC determines that the application context relocation succeeds.

For the case 5, the EEC determines that the application context relocation fails.

In the example 3, the EEC indicates the S-EES to initiate the transfer of the application context and/or the EEC context, the S-EES receives the application context transfer result and the EEC context transfer result, and sends the transfer results to the EEC, and the EEC initiates context re-transfer or EEC context deletion, or the EAS re-subscribes to the required service from the EES based on the transfer results, to ensure that both the application context and the EEC context are relocated to the target side during the application context relocation process; and when the context fails to be transferred, the entire ACR procedure or EEC context relocation procedure is not performed.

It may be understood that, to implement the functions in the foregoing embodiments, the communication apparatus includes a corresponding hardware structure and/or software module for performing each function. A person skilled in the art should be easily aware that, in combination with the units and the method steps in the examples described in embodiments disclosed in this application, this application can be implemented by using hardware or a combination of hardware and computer software. Whether a function is performed by using hardware or hardware driven by computer software depends on particular application scenarios and design constraints of the technical solutions.

Figure 14:
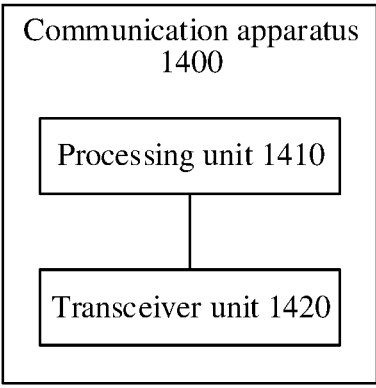
FIG. 14 is a schematic diagram of a structure of a possible communication apparatus according to an embodiment of this application.
Figure 15:
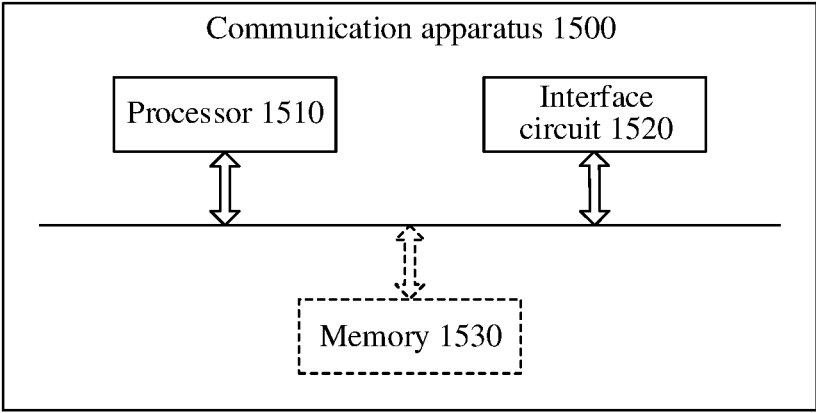
FIG. 15 is a schematic diagram of another structure of a possible communication apparatus according to an embodiment of this application.

FIG. 14 and FIG. 15 are schematic diagrams of structures of possible communication apparatuses according to embodiments of this application. The communication apparatuses may be configured to implement the functions of the first apparatus or the target EAS in the foregoing method embodiments. Therefore, beneficial effects of the foregoing method embodiments can also be achieved. In embodiments of this application, the communication apparatus may be the EEC 112, the EAS 131, or the EES 132 shown in FIG. 1, or may be a module (such as a chip) used in the EEC 112, the EAS 131, or the EES 132.

As shown in FIG. 14, the communication apparatus 1400 includes a processing unit 1410 and a transceiver unit 1420.

When the communication apparatus 1400 is configured to implement the functions of the first apparatus in the method embodiments:

In some embodiments, the transceiver unit 1420 is configured to: when an EEC context fails to be relocated from a second EES to a first EES, send first information to a first EAS corresponding to the first EES, where the first information is used by the first EAS to subscribe to EES capability exposure information from the first EES.

Optionally, the first information includes EEC context transfer failure notification information or first indication information, where the EEC context transfer failure notification information notifies the first EAS that the EEC context fails to be transferred, and the first indication information indicates the first EAS to subscribe to the EES capability exposure information from the first EES.

Optionally, the first information includes EEC context transfer failure notification information and application context transfer success notification information, where the EEC context transfer failure notification information notifies an EEC that the EEC context fails to be transferred, and the application context transfer success notification information notifies the EEC that an application context is successfully transferred.

Optionally, the EES capability exposure information includes at least one of the following information: a UE location API, an application context relocation event, an AC information exposure API, a UE identifier API, and a QoS session API.

Optionally, the apparatus is the first EES or the second EES. The transceiver unit 1420 is further configured to send second information to the EEC, where the second information indicates the EEC to initiate registration with the first EES.

Optionally, the second information may directly or indirectly indicate the EEC to initiate registration with the first EES. For example, the second information includes the EEC context transfer failure notification information, and the EEC context transfer failure notification information notifies the EEC that the EEC context fails to be transferred. For another example, the second information includes the EEC context transfer failure notification information and the application context transfer success notification information, where the EEC context transfer failure notification information notifies the EEC that the EEC context fails to be transferred, and the application context transfer success notification information notifies the EEC that the application context is successfully transferred. For another example, the second information includes second indication information, and the second indication information indicates the EEC to initiate registration with the first EES.

Optionally, the first apparatus is the first edge enabler server or the second edge enabler server; and the transceiver unit 1420 is further configured to send third information to the EEC, where the third information indicates the EEC to subscribe to an EAS discovery and/or EAS information service from the first EES.

Optionally, the third information may directly or indirectly indicate the EEC to subscribe to the EAS discovery and/or EAS information service from the first EES. For example, the third information includes the EEC context transfer failure notification information, and the EEC context transfer failure notification information notifies the EEC that the EEC context fails to be transferred. For another example, the third information includes the EEC context transfer failure notification information and the application context transfer success notification information, where the EEC context transfer failure notification information notifies the EEC that the EEC context fails to be transferred, and the application context transfer success notification information notifies the EEC that the application context is successfully transferred. For another example, the third information includes third indication information, and the third indication information indicates the EEC to subscribe to the EAS discovery and/or EAS information service from the first EES.

Optionally, the apparatus is the second EES, and the transceiver unit 1420 is further configured to receive fourth information from the first EES, where the fourth information indicates that the EEC context fails to be transferred. The processing unit 1410 is used by the first apparatus to determine, based on the fourth information, that the EEC context fails to be transferred.

Optionally, the processing unit 1410 is further configured to: when relocation of the application context is triggered, determine the first EES and the first EAS. The transceiver unit 1420 is further configured to transmit the EEC context to the first EES. The transceiver unit 1420 is further configured to indicate a second EAS associated with the apparatus to send the application context to the first EAS; or send, to the first EAS through the first EES, the application context obtained from the second EAS.

Optionally, the apparatus is the first EES, and the processing unit 1410 is configured to: when the apparatus does not receive the EEC context from the second EES, determine that the EEC context fails to be transferred.

Optionally, the processing unit 1410 is further configured to: when relocation of the application context is triggered, determine the second EES and a second EAS associated with the second EES. The transceiver unit 1420 is further configured to request the EEC context from the second EES. The transceiver unit 1420 is further configured to indicate the first EAS to request the application context from the second EAS; or request the application context from the second EES.

Optionally, the first apparatus is the EEC, and the transceiver unit 1420 is further configured to initiate registration with the first EES.

Optionally, the transceiver unit 1420 is further configured to receive fifth information from the first EES or the second EES, where the fifth information indicates that the EEC context fails to be transferred. The processing unit 1410 is configured to determine, based on the fifth information, that the EEC context fails to be transferred.

Optionally, the transceiver unit 1420 is further configured to: when relocation of an application context is triggered, send sixth information to the first EES or the second EES, where the sixth information indicates to initiate transfer of the application context and the EEC context.

Optionally, the first apparatus is the EEC, and the transceiver unit 1420 is further configured to subscribe to an EAS discovery and/or EAS information service from the first EES.

Optionally, the transceiver unit 1420 is specifically configured to send the first information to the first EAS through the first EES.

In some other embodiments, the transceiver unit 1420 is configured to: when the application context is successfully transferred and the EEC context fails to be transferred, the first apparatus requests the second EES to re-transfer the EEC context to the first apparatus, or the first apparatus re-transfers the EEC context to the first EES, where the EEC context is transferred by the second EES to the first EES.

In some other embodiments, the transceiver unit 1420 is configured to: when the application context is successfully transferred and the EEC context fails to be transferred, the first apparatus sends seventh information to the second EES, where the seventh information indicates the second EES to re-transfer the EEC context to the first EES; or the first apparatus sends eighth information to the first EES, where the eighth information indicates the first EES to request the second EES to re-transfer the EEC context, and the EEC context is transferred by the second EES to the first EES.

The transceiver unit 1420 is configured to: when the EEC context is successfully transferred, the application context fails to be transferred, and the EES needs to be reselected, the first apparatus deletes the EEC context; or the first apparatus sends ninth information to the first EES, where the ninth information indicates the first EES to delete the EEC context, and the EEC context is transferred by the second EES to the first EES.

The transceiver unit 1420 is configured to: when the EEC context is successfully transferred, the application context fails to be transferred, and the EES does not need to be reselected, the first apparatus sends tenth information to the second EAS, where the tenth information indicates the second EAS to re-transfer the application context to the first EAS; or the first apparatus sends eleventh information to the first EAS, where the eleventh information indicates the first EAS to request the second EAS to re-transfer the application context.

Optionally, the first apparatus is the source EES, and the processing unit 1410 is configured to: when relocation of the application context is triggered, determine the target EES and a target EAS associated with the target EES. The transceiver unit 1420 is further configured to transmit the EEC context to the target EES. The transceiver unit 1420 is further configured to indicate a source EAS associated with the first apparatus to send the application context to the target EAS; or send, to the target EES, the application context obtained from the source EAS.

Optionally, the transceiver unit 1420 is further configured to receive fourth information from the target EES, where the fourth information indicates a transfer result of the EEC context. The processing unit 1410 is further configured to determine, based on the fourth information, the transfer result of the EEC context transfer.

Optionally, the first apparatus is the target EES, and the processing unit 1410 is further configured to: when relocation of the application context is triggered, determine a source EES and a source EAS associated with the source EES. The transceiver unit 1420 is further configured to request the EEC context from the source EES. The transceiver unit 1420 is further configured to indicate the target EAS to request the application context from the source EAS; or request the application context from the source EES.

Optionally, the processing unit 1410 is further configured to determine a transfer result of the EEC context depending on whether the EEC context is received from the source EES.

Optionally, the first apparatus is the EEC, and the transceiver unit 1420 is further configured to: when relocation of the application context is triggered, send sixth information to the source EES or the target EES, where the sixth information indicates to initiate transfer of the application context and the EEC context.

Optionally, the transceiver unit 1420 is further configured to receive fifth information from the source EES or the target EES, where the fifth information indicates a transfer result of the EEC context. The processing unit 1410 is further configured to determine the transfer result of the EEC context based on the fifth information.

When the communication apparatus 1400 is configured to implement the functions of the target EAS in the method embodiments:

The transceiver unit 1420 is configured to receive first information from a first apparatus, where the first information is used by a first EAS to subscribe to EES capability exposure information from a first EES associated with the first EAS; and subscribe to the EES capability exposure information from the first EES based on the first information.

Optionally, the first apparatus may be a source EES, a target EES, or an EEC.

Optionally, the first information includes EEC context transfer failure notification information or first indication information, where the EEC context transfer failure notification information notifies the first EAS that an EEC context fails to be transferred, and the first indication information indicates the first EAS to subscribe to the EES capability exposure information from the first EES.

Optionally, the first information includes EEC context transfer failure notification information and application context transfer success notification information, where the EEC context transfer failure notification information notifies the EEC that an EEC context fails to be transferred, and the application context transfer success notification information notifies the EEC that an application context is successfully transferred.

Optionally, the EES capability exposure information includes at least one of the following information: a UE location API, an application context relocation event, an AC information exposure API, a UE identifier API, and a QoS session API.

When the communication apparatus 1400 is configured to implement the functions of the EEC in the method embodiments:

The transceiver unit 1420 is configured to: receive second information from a first apparatus, where the second information is used by the EEC to initiate registration with a first EES; and initiate registration with the first EES based on the second information.

Optionally, the second information may directly or indirectly indicate the EEC to initiate registration with the first EES. For example, the second information includes EEC context transfer failure notification information, and the EEC context transfer failure notification information notifies the EEC that an EEC context fails to be transferred. For another example, the second information includes EEC context transfer failure notification information and application context transfer success notification information, where the EEC context transfer failure notification information notifies the EEC that an EEC context fails to be transferred, and the application context transfer success notification information notifies the EEC that an application context is successfully transferred. For another example, the second information includes second indication information, and the second indication information indicates the EEC to initiate registration with the first EES.

Optionally, the transceiver unit 1420 is further configured to: receive third information from the first apparatus, where the third information indicates the EEC to subscribe to an EAS discovery and/or EAS information service from the first EES; and subscribe to the EAS discovery and/or EAS information service from the first EES based on the third information.

Optionally, the third information may directly or indirectly indicate the EEC to subscribe to the EAS discovery and/or EAS information service from the first EES. For example, the third information includes the EEC context transfer failure notification information, and the EEC context transfer failure notification information notifies the EEC that the EEC context fails to be transferred. For another example, the third information includes the EEC context transfer failure notification information and the application context transfer success notification information, where the EEC context transfer failure notification information notifies the EEC that the EEC context fails to be transferred, and the application context transfer success notification information notifies the EEC that the application context is successfully transferred. For another example, the third information includes third indication information, and the third indication information indicates the EEC to subscribe to the EAS discovery and/or EAS information service from the first EES.

For more detailed descriptions about the processing unit 1410 and the transceiver unit 1420, refer to related descriptions in the method embodiments directly. Details are not described herein again.

As shown in FIG. 15, the communication apparatus 1500 includes a processor 1510 and an interface circuit 1520. The processor 1510 and the interface circuit 1520 are coupled to each other. It may be understood that the interface circuit 1520 may be a transceiver or an input/output interface. Optionally, the communication apparatus 1500 may further include a memory 1530, configured to: store instructions to be executed by the processor 1510, or store input data required by the processor 1510 to run the instructions, or store data generated after the processor 1510 runs the instructions.

When the communication apparatus 1500 is configured to implement the method in the method embodiments, the processor 1510 is configured to implement a function of the processing unit 1410, and the interface circuit 1520 is configured to implement a function of the transceiver unit 1420.

When the communication apparatus is a chip used in a first apparatus, the first apparatus chip implements the functions of the first apparatus in the foregoing method embodiments. The chip of the first apparatus receives information from another module (for example, a radio frequency module or an antenna) in the first apparatus, where the information is sent by another apparatus to the first apparatus; or the chip of the first apparatus sends information to another module (for example, a radio frequency module or an antenna) in the first apparatus, where the information is sent by the first apparatus to another apparatus.

When the communication apparatus is a chip used in a target EAS, the chip implements the functions of the target EAS in the foregoing method embodiments. The chip receives information from another module (for example, a radio frequency module or an antenna) in the target EAS, where the information is sent by another apparatus to the target EAS; or the chip sends information to another module (for example, a radio frequency module or an antenna) in the target EAS, where the information is sent by the target EAS to another apparatus.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, any conventional processor, or the like.

The method steps in embodiments of this application may be implemented in a hardware manner, or may be implemented in a manner of executing software instructions by the processor. The software instructions may include a corresponding software module. The software module may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a first apparatus or a target EAS. Certainly, the processor and the storage medium may exist in the first apparatus or the target EAS as discrete components.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, a network device, user equipment, or another programmable apparatus. The computer programs or instructions may be stored in a computer-readable storage medium, or may be transferred from a computer-readable storage medium to another computer-readable storage medium. For example, the computer programs or instructions may be transferred from a website, computer, server, or data center to another website, computer, server, or data center in a wired manner or in a wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid-state drive.

In embodiments of this application, unless otherwise stated or there is a logic conflict, terms and/or descriptions between different embodiments are consistent and may be mutually referenced, and technical features in different embodiments may be combined into a new embodiment based on an internal logical relationship thereof.

In this application, at least one means one or more, and a plurality of means two or more. The term "and/or" describes an association relationship between associated objects, and represents that three relationships may exist. For example, A and/or B may represent the following cases: Only A exists, both A and B exist, and only B exists, where A and B may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

Unless otherwise stated, meanings of all technical and scientific terms used in embodiments of this application are the same as those usually understood by a person skilled in the technical field of this application. The terms used in this application are merely intended to describe objectives of the specific embodiments, and are not intended to limit the scope of this application. It should be understood that the foregoing descriptions are examples for description, and the foregoing examples are merely intended to help a person skilled in the art understand embodiments of this application, but are not intended to limit embodiments of this application to specific values or specific scenarios of the examples. It is clear that a person skilled in the art can make various equivalent modifications or changes based on the examples provided in this specification, and such modifications and changes also fall within the scope of embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A context transfer method, wherein the method comprises:

determining, by a first edge enabler server, that an edge enabler client context fails to be relocated from a second edge enabler server to the first edge enabler server; and in response to the determining that the edge enabler client context fails to be relocated, sending, by the first edge enabler server, first information to a first edge application server corresponding to the first edge enabler server, wherein the first information is configured to cause the first edge application server to subscribe to edge enabler server capability exposure information from the first edge enabler server, and wherein the edge enabler server capability exposure information comprises an application context relocation event and a quality of service session application programming interface.

2. The method according to claim 1, wherein the first information comprises edge enabler client context transfer failure notification information or first indication information, wherein the edge enabler client context transfer failure notification information notifies the first edge application server that the edge enabler client context fails to be relocated, and the first indication information indicates the first edge application server to subscribe to the edge enabler server capability exposure information from the first edge enabler server.

3. The method according to claim 1, wherein the edge enabler server capability exposure information further comprises: a user equipment location application programming interface, an application client information exposure application programming interface, and a user equipment identifier application programming interface.

4. The method according to claim 1, wherein the method further comprises:

sending, by the first edge enabler server, third information to an edge enabler client, wherein the third information is configured to cause the edge enabler client to subscribe to subscription information of an interface between the edge enabler client and the first edge enabler server.

5. The method according to claim 4, wherein the third information comprises edge enabler client context transfer failure notification information or third indication information, wherein the edge enabler client context transfer failure notification information notifies the first edge application server that the edge enabler client context fails to be relocated, and the third indication information indicates the edge enabler client to subscribe to the subscription information.

6. The method according to claim 1, wherein the method further comprises:

determining, by the first edge enabler server, that an application context is successfully relocated from the second edge enabler server to the first edge enabler server; and in response to the determining that the edge enabler client context fails to be relocated, sending, by a first edge enabler server, first information to a first edge application server corresponding to the first edge enabler server, comprises:

when the application context is successfully relocated, and the edge enabler client context fails to be relocated from the second edge enabler server to the first edge enabler server, sending, by the first edge enabler server, the first information to the first edge application server;

wherein the application context comprises a context of subscription of the one or more users in an edge application server and a core network, and the edge enabler client context comprises user-related data stored in an edge enabler server.

7. A communication method, wherein the method comprises:

in response to an edge enabler client context failing to be relocated from a second edge enabler server to a first edge enabler server, receiving, by a first edge application server corresponding to the first edge enabler server, first information from the first edge enabler server, wherein the first information is configured to cause the first edge application server to subscribe to edge enabler server capability exposure information from the first edge enabler server; and subscribing to, by the first edge application server, the edge enabler server capability exposure information from the first edge enabler server based on the first information.

8. The method according to claim 7, wherein the first information comprises edge enabler client context transfer failure notification information or first indication information, wherein the edge enabler client context transfer failure notification information notifies the first edge application server that an edge enabler client context fails to be relocated, and the first indication information indicates the first edge application server to subscribe to the edge enabler server capability exposure information from the first edge enabler server.

9. The method according to claim 7, wherein the edge enabler server capability exposure information comprises at least one of the following information: a user equipment location application programming interface, an application context relocation event, an application client information exposure application programming interface, a user equipment identifier application programming interface, and a quality of service session application programming interface.

10. The method according to claim 7, wherein in response to the edge enabler client context failing to be relocated from the second edge enabler server to the first edge enabler server, receiving, by the first edge application server corresponding to the first edge enabler server, first information from the first edge enabler server comprises:

when an application context is successfully transferred, and the edge enabler client context fails to be relocated from the second edge enabler server to the first edge enabler server, receiving, by the first edge application server, the first information from the first edge enabler server.

11. A communication apparatus, comprising at least one processor, and at least one memory, wherein the at least one processor is configured to read instructions stored in the at least one memory to perform the following operations:

determining that an edge enabler client context fails to be relocated from a second edge enabler server to a first edge enabler server; and in response to determining that the edge enabler client context fails to be relocated, sending first information to a first edge application server corresponding to the first edge enabler server, wherein the first information is configured to cause the first edge application server to subscribe to edge enabler server capability exposure information from the first edge enabler server, and wherein the edge enabler server capability exposure information comprises an application context relocation event and a quality of service session application programming interface.

12. The communication apparatus according to claim 11, wherein the first information comprises edge enabler client context transfer failure notification information or first indication information, wherein the edge enabler client context transfer failure notification information notifies the first edge application server that the edge enabler client context fails to be relocated, and the first indication information indicates the first edge application server to subscribe to the edge enabler server capability exposure information from the first edge enabler server.

13. The communication apparatus according to claim 11, wherein the edge enabler server capability exposure information further comprises: a user equipment location application programming interface, an application client information exposure application programming interface, and a user equipment identifier application programming interface.

14. The communication apparatus according to claim 11, wherein the at least one processor is configured to read instructions stored in the at least one memory to further perform the following operation:

sending third information to an edge enabler client, wherein the third information configured to cause the edge enabler client to subscribe to subscription information of an interface between the edge enabler client and the first edge enabler server.

15. The communication apparatus according to claim 14, wherein the third information comprises edge enabler client context transfer failure notification information or third indication information, wherein the edge enabler client context transfer failure notification information notifies the first edge application server that the edge enabler client context fails to be relocated, and the third indication information indicates the edge enabler client to subscribe to the subscription information.

16. The communication apparatus according to claim 11, wherein the at least one processor is configured to read instructions stored in the at least one memory to further perform the following operation:

determining that an application context is successfully relocated from the second edge enabler server to the first edge enabler server; and in response to the determining that the edge enabler client context fails to be relocated from the second edge enabler server to the first edge enabler server, sending first information to the first edge application server corresponding to the first edge enabler server, comprises:

when the application context is successfully transferred, and the edge enabler client context fails to be relocated from the second edge enabler server to the first edge enabler server, sending the first information to the first edge application server;

wherein the application context comprises a context of subscription of the one or more users in an edge application server and a core network, and the edge enabler client context comprises user-related data stored in an edge enabler server.

17. A communication apparatus, comprising at least one processor, and at least one memory, wherein the at least one processor is configured to read instructions stored in the at least one memory to perform the following operations:

in response to an edge enabler client context failing to be relocated from a second edge enabler server to a first edge enabler server, receiving first information from the first edge application server, wherein the first information is configured to cause the first edge application server to subscribe to edge enabler server capability exposure information from the first edge enabler server, and wherein the edge enabler server capability exposure information comprises an application context relocation event and a quality of service session application programming interface; and subscribing to the edge enabler server capability exposure information from the first edge enabler server based on the first information.

18. The communication apparatus according to claim 17, wherein the first information comprises edge enabler client context transfer failure notification information or first indication information, wherein the edge enabler client context transfer failure notification information notifies the first edge application server that an edge enabler client context fails to be relocated, and the first indication information indicates the first edge application server to subscribe to the edge enabler server capability exposure information from the first edge enabler server.

19. The communication apparatus according to claim 17, wherein the edge enabler server capability exposure information further comprises: a user equipment location application programming interface, an application client information exposure application programming interface, and a user equipment identifier application programming interface.

20. The communication apparatus according to claim 17, wherein in response to the edge enabler client context failing to be relocated from the second edge enabler server to the first edge enabler server, receiving first information from the first edge enabler server comprises:

when an application context is successfully transferred, and the edge enabler client context fails to be relocated from the second edge enabler server to the first edge enabler server, receiving the first information from the first edge enabler server.

* * * * *